(12) United States Patent
Lu et al.

(10) Patent No.: US 11,811,310 B2
(45) Date of Patent: Nov. 7, 2023

(54) POWER CONVERSION SYSTEM AND CONTROL METHOD

(71) Applicant: Delta Electronics (Shanghai) Co., Ltd., Shanghai (CN)

(72) Inventors: Cheng Lu, Shanghai (CN); Hong Liu, Shanghai (CN); Wenfei Hu, Shanghai (CN); Jie Kong, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 100 days.

(21) Appl. No.: 17/447,069

(22) Filed: Sep. 8, 2021

(65) Prior Publication Data
US 2022/0158549 A1 May 19, 2022

(30) Foreign Application Priority Data
Nov. 17, 2020 (CN) .......................... 202011285303.4

(51) Int. Cl.
*H02M 3/04* (2006.01)
*H02M 7/04* (2006.01)
*H02J 7/00* (2006.01)

(52) U.S. Cl.
CPC ............... *H02M 3/04* (2013.01); *H02M 7/04* (2013.01); *H02J 7/0013* (2013.01)

(58) Field of Classification Search
None
See application file for complete search history.

(56) References Cited

U.S. PATENT DOCUMENTS

| | | | |
|---|---|---|---|
| 2009/0315393 A1* | 12/2009 | Yeh ........................... | B60L 1/00 307/10.1 |
| 2017/0274792 A1 | 9/2017 | Vaughan et al. | |
| 2019/0052177 A1 | 2/2019 | Lu et al. | |
| 2021/0061114 A1* | 3/2021 | Sun ........................... | H02J 7/02 |

FOREIGN PATENT DOCUMENTS

| | | |
|---|---|---|
| CN | 103248232 A | 8/2013 |
| CN | 106891756 A | 6/2017 |
| CN | 108306515 A | 7/2018 |
| WO | 2013100764 A1 | 7/2013 |

OTHER PUBLICATIONS

Corresponding European Search Report dated Mar. 18, 2022.

* cited by examiner

*Primary Examiner* — Jared Fureman
*Assistant Examiner* — Aqeel H Bukhari
(74) *Attorney, Agent, or Firm* — CKC & Partners Co., LLC

(57) ABSTRACT

Embodiments of the present disclosure provide a power conversion system and a control method. The power conversion system includes multiple power modules, and each power module includes a first port, a second port, and a third port, where the first port of each power module is connected to an external device, second ports of the power modules are independent of each other and used as independent ports to output power, third ports of the power modules are connected in parallel to form a power bus and power flow of the third port of each power module is bidirectional.

23 Claims, 17 Drawing Sheets

POWER CONVERSION SYSTEM AND CONTROL METHOD

CROSS-REFERENCE TO RELATED APPLICATION

This application claims priority to Chinese Patent Application No. 202011285303.4, filed on Nov. 17, 2020, which is hereby incorporated by reference in its entirety.

TECHNICAL FIELD

Embodiments of the present disclosure relate to the field of charging technologies, and in particular to a power conversion system and a control method.

BACKGROUND

A charging station is used as an application scenario for charging electric vehicles with different voltages and different power levels, and its power supply architecture has requirements for high charging efficiency, multiple (isolated) charging ports, and a wide range of charging voltages.

FIG. 1 is a schematic diagram of a power supply architecture of a charging station based on a line frequency transformer (LFT). As shown in FIG. 1, the LFT is used to achieve step down and medium-voltage isolation, a first-stage AC-DC circuit is a controllable rectifier circuit, and a second-stage isolated DC-DC circuit connected to the first-stage AC-DC circuit realizes charging of a vehicle battery and electrical isolation between vehicles.

However, the line frequency transformer is not only bulky and heavy, but also has low charging efficiency due to magnetizing loss at no load and light load conditions. Therefore, a power supply architecture based on a solid state transformer (SST) has been increasingly used.

FIG. 2 is a schematic diagram of a power supply architecture of a charging station based on a solid state transformer. As shown in FIG. 2, a common direct current (DC) bus architecture is used, the SST is directly connected to a medium voltage alternating current (AC) grid and provides a DC bus, and multiple isolated DC-DC chargers are connected to the DC bus, to charge multiple electric vehicles. A first stage of the SST is usually CHB (Cascaded H-Bridge), and each H-bridge is connected with a high-frequency isolated DC-DC circuit for medium-voltage isolation and voltage conversion. Output ends of a second-stage DC-DC circuit of the SST are connected in parallel to form a DC bus, and multiple DC-DC chargers connected to the DC bus need to adopt an isolation conversion topology to achieve galvanic isolation among vehicles. For the SST power supply architecture with the DC bus, although the use of high-frequency isolation instead of line-frequency isolation can reduce the volume and weight, there is a multi-stage conversion circuit with repeated isolation from the medium-voltage grid to the charging terminal of the vehicle, and the more stages of conversion, the lower efficiency of the system, and also the cost increases.

SUMMARY

Embodiments of the present disclosure provide a power conversion system and a control method to achieve high-efficiency charging of multiple independent ports, and to overcome a DC link imbalance problem caused by the power imbalance of the independent ports.

In a first aspect, an embodiment of the present disclosure provides a power conversion system, including:
a first power module and a second power module, where each power module includes a first port, a second port and a third port;
the second port of the first power module and the second port of the second power module are independent of each other; and
the third port of the first power module and the third port of the second power module are connected in parallel to form a power bus, and power flow of the third port is bidirectional.

In some possible embodiments, the first port of the first power module and the first port of the second power module are connected in series and then electrically connected to an external device.

In some possible embodiments, when power of the second port of the first power module is not equal to power of the second port of the second power module, the third port of the first power module and the third port of the second power module exchange power through the power bus, so that power of the first port of the first power module and power of the first port of the second power module tend to be equal.

In some possible embodiments, the second port of the first power module and the second port of the second power module output power respectively. When the power output by the second port of the first power module is less than the power output by the second port of the second power module, at least part of input power of the first port of the first power module is transferred to the third port of the first power module, and then transferred to the third port of the second power module through the power bus, and finally transferred to the second port of the second power module, so that the input power of the first port of the first power module and input power of the first port of the second power module tend to be equal.

In some possible embodiments, the second port of the first power module and the second port of the second power module input power respectively. When input power of the second port of the first power module is less than input power of the second port of the second power module, at least part of the input power of the second port of the second power module is transferred to the third port of the second power module, and then transferred to the third port of the first power module through the power bus, and finally transferred to the second port of the first power module, so that output power of the first port of the first power module and output power of the first port of the second power module tend to be equal.

In some possible embodiments, when the second port of the first power module is used to output power and the second port of the second power module is used to input power, at least part of input power of the second port of the second power module is transferred to the third port of the second power module, and then transferred to the third port of the first power module through the power bus, and finally transferred to the second port of the first power module, so that the power of the first port of the first power module and the power of the first port of the second power module tend to be equal.

In some possible embodiments, the first power module and the second power module respectively include a first power sub-module. The first power sub-module includes a first end, a second end, and a third end. The first port is electrically connected to the first end of the first power sub-module, the second port is electrically connected to the second end of the first power sub-module, and the third port is electrically connected to the third end of the first power sub-module, where the first end and the second end of the first power sub-module are DC ends.

In some possible embodiments, the first power sub-module includes a first DC-DC conversion circuit and a second DC-DC conversion circuit. The first end of the first power sub-module is electrically connected to a first end of the first DC-DC conversion circuit and a first end of the second DC-DC conversion circuit, a second end of the first DC-DC conversion circuit is electrically connected to the second end of the first power sub-module, and a second end of the second DC-DC conversion circuit is connected to the third end of the first power sub-module.

In some possible embodiments, a switching frequency of the first DC-DC conversion circuit and a switching frequency of the second DC-DC conversion circuit are different.

In some possible embodiments, the first power module and the second power module further include a third DC-DC conversion circuit and a fourth DC-DC conversion circuit. The second end of the first power sub-module is electrically connected to the second port through the third DC-DC conversion circuit, and the third end of the first power sub-module is electrically connected to the third port through the fourth DC-DC conversion circuit.

In some possible embodiments, the first power sub-module includes a multi-winding transformer. The multi-winding transformer includes a primary winding, a first secondary winding and a second secondary winding. The first end of the first power sub-module is electrically connected to the primary winding through an inverter circuit, the first secondary winding is electrically connected to the second end of the first power sub-module through a first rectifier circuit, and the second secondary winding is electrically connected to the third end of the first power sub-module.

In some possible embodiments, the second secondary winding is directly electrically connected to the third end of the first power sub-module, and is directly electrically connected to the third port.

In some possible embodiments, the second secondary winding is electrically connected to the third end of first power sub-module through a second rectifier circuit.

In some possible embodiments, the first power module and the second power module respectively include a fifth DC-DC conversion circuit. The third end of the first power sub-module is electrically connected to the third port through the fifth DC-DC conversion circuit.

In some possible embodiments, both the first power module and the second power module respectively include a sixth DC-DC conversion circuit. The second end of the first power sub-module is electrically connected to the second port through the sixth DC-DC conversion circuit.

In some possible embodiments, the first secondary winding is electrically connected to the second end of the first power sub-module through a first impedance adjustment circuit and the first rectifier circuit; and/or, the second secondary winding is electrically connected to the third end of the first power sub-module through a second impedance adjustment circuit.

In some possible embodiments, the primary winding is electrically connected to the first end of the first power sub-module through a third impedance adjustment circuit and the inverter circuit.

In some possible embodiments, the first impedance adjustment circuit includes a first capacitor; or, the first impedance adjustment circuit includes a second capacitor and a first inductor, and the second capacitor and the first inductor are connected in series;

the second impedance adjustment circuit includes a third capacitor; or, the second impedance adjustment circuit includes a fourth capacitor and a second inductor, and the fourth capacitor and the second inductor are connected in series.

In some possible embodiments, the third impedance adjustment circuit includes a fifth capacitor; or, the third impedance adjustment circuit includes a sixth capacitor and a third inductor, and the sixth capacitor and the third inductor are connected in series.

In some possible embodiments, the first power sub-module includes an eighth DC-DC conversion circuit and a ninth DC-DC conversion circuit. The first end of the first power sub-module is electrically connected to a first end of the eighth DC-DC conversion circuit, a second end of the eighth DC-DC conversion circuit is electrically connected to the second end of the first power sub-module, a first end of the ninth DC-DC conversion circuit is electrically connected to the second end of the eighth DC-DC conversion circuit, and a second end of the ninth DC-DC conversion circuit is electrically connected to the third end of the first power sub-module.

In some possible embodiments, the first power sub-module includes a tenth DC-DC conversion circuit and a first DC-AC conversion circuit. The first end of the first power sub-module is electrically connected to a first end of the tenth DC-DC conversion circuit, a second end of the tenth DC-DC conversion circuit is electrically connected to the second end of the first power sub-module, and a first end of the first DC-AC conversion circuit is electrically connected to the first end of the first power sub-module. The first DC-AC conversion circuit includes a transformer, and a secondary winding of the transformer is electrically connected to the third end of the first power sub-module.

In some possible embodiments, the first power sub-module includes an eleventh DC-DC conversion circuit and a second DC-AC conversion circuit. The first end of the first power sub-module is electrically connected to a first end of the eleventh DC-DC conversion circuit, a second end of the eleventh DC-DC conversion circuit is electrically connected to the second end of the first power sub-module, and a first end of the second DC-AC conversion circuit is electrically connected to the second end of the first power sub-module. The second DC-AC conversion circuit includes a transformer, and a secondary winding of the transformer is electrically connected to the third end of the first power sub-module.

In some possible embodiments, the first power module and the second power module respectively include a second power sub-module, and the first end of the first power sub-module is electrically connected to the first port through the second power sub-module.

In some possible embodiments, the second power sub-module is an AC-DC conversion circuit or a seventh DC-DC conversion circuit.

In a second aspect, an embodiment of the present disclosure provides a three-phase power conversion system, and each phase includes the power conversion system according to any one of the first aspect; where the first port is an AC port, and the three-phase power conversion system is a three-phase three-wire or three-phase four-wire Delta connection or star connection system.

In some possible embodiments, second ports of first power modules in at least three power conversion systems are connected in parallel, where at least one of the at least three power conversion systems belongs to a first-phase power conversion system in the three-phase power conversion system, at least one of the at least three power conversion systems belongs to a second-phase power conversion system in the three-phase power conversion system, and at least one of the at least three power conversion systems belongs to a third-phase power conversion system in the three-phase power conversion system.

In some possible embodiments, second ports of second power modules in the at least three power conversion systems are connected in parallel.

In some possible embodiments, power buses of power conversion systems of respective phases in the three-phase power conversion system are connected in parallel.

In a third aspect, an embodiment of the present disclosure provides a control method for a power conversion system, where
the power conversion system includes a first power module and a second power module, where each power module includes a first port, a second port and a third port;
the second port of the first power module and the second port of the second power module are independent of each other; and
the third port of the first power module and the third port of the second power module are connected in parallel to form a power bus, and power flow of the third port is bidirectional, and the control method includes:
calculating average power of third ports and second ports of all power modules;
calculating a power command value of the third port of each power module according to the average power and power of the second port of each power module; and
controlling the power of the third port of each power module according to the power command value of the third port of each power module.

In some possible embodiments, the first power module and the second power module respectively include a first power sub-module and a second power sub-module. A first end of the second power sub-module is electrically connected to the first port, a second end of the second power sub-module is electrically connected to the first power sub-module through a DC link, and the second power sub-module performs voltage balance control on the DC link.

In some possible embodiments, when the power of the third port is greater than rated power, amplitude limiting is performed on the power command value.

In a fourth aspect, an embodiment of the present disclosure provides a control method for a power conversion system, where
the power conversion system includes a first power module and a second power module, where each power module includes a first port, a second port and a third port;
the second port of the first power module and the second port of the second power module are independent of each other; and
the third port of the first power module and the third port of the second power module are connected in parallel to form a power bus, power flow of the third port is bidirectional, and each power module includes a DC link, and the control method includes:
calculating an average value of voltages of DC links of all power modules;
calculating an output voltage command value of each third port according to the average value of the voltages of the DC links, a given value of an output voltage of the third port, and a voltage value of the DC link of each power module; and
controlling a voltage of the third port of each power module according to the output voltage command value of the third port of each power module.

In some possible embodiments, the first power module and the second power module respectively include a first power sub-module and a second power sub-module. A first end of the second power sub-module is electrically connected to the first port, a second end of the second power sub-module is electrically connected to the first power sub-module through the DC link, and the second power sub-module performs voltage balance control on the DC link.

In some possible embodiments, when the power of the third port is greater than rated power, amplitude limiting is performed on the power command value.

The embodiments of the present disclosure provide a power conversion system and a control method. The power conversion system includes a plurality of power modules, and each of the power modules includes a first port, a second port, and a third port, where first ports of the power modules are connected to external devices respectively, second ports of the power modules are independent of each other which are used as independent ports to input or output power, and third ports of the power modules are connected in parallel with each other to form a power bus and power flow of each of the third ports of the power modules is bidirectional. Therefore, when power of the second ports are imbalanced, the power bus formed by the third ports connected in parallel realizes power regulating among the plurality of power modules, so that power of the first ports of the power modules tends to be equal, thereby meeting different power requirements of the second ports, and reducing or eliminating a DC link voltage balance problem caused thereby.

BRIEF DESCRIPTION OF DRAWINGS

In order to describe the technical solutions in the embodiments of the present disclosure or the prior art more clearly, the following will briefly introduce the accompanying drawings required for describing the embodiments or the prior art. Obviously, the drawings in the following description show some embodiments of the present disclosure. For those of ordinary skill in the art, other drawings can be obtained based on these drawings without creative work.

FIG. 10a is a schematic structural diagram of a power conversion system constituted by the power module shown in FIG. 9a;

DETAILED DESCRIPTION OF EMBODIMENTS

In order to make the objectives, technical solutions, and advantages of the embodiments of the present disclosure clearer, the technical solutions in the embodiments of the present disclosure will be described clearly and completely in conjunction with the accompanying drawings in the embodiments of the present disclosure. Obviously, the described embodiments are part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
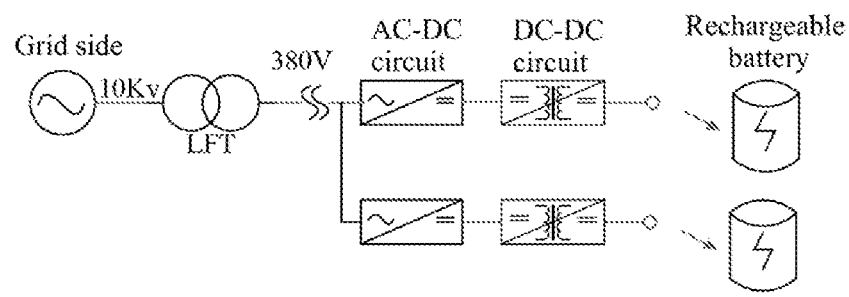
FIG. 1 is a schematic diagram of a power supply architecture of a charging station based on a line frequency transformer.
Figure 2:
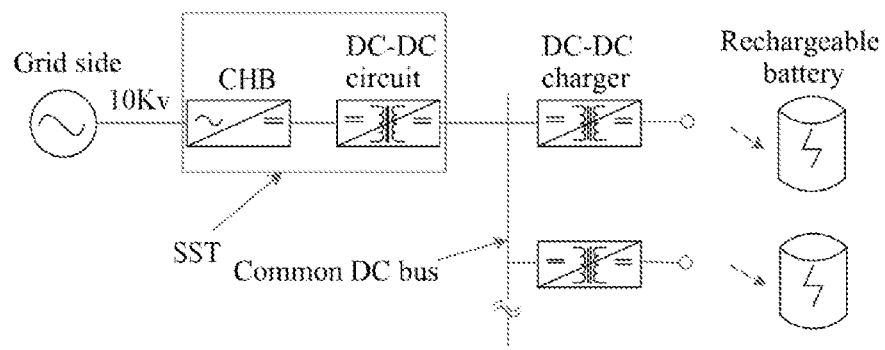
FIG. 2 is a schematic diagram of a power supply architecture of a charging station based on a solid state transformer with a DC bus.
Figure 3:
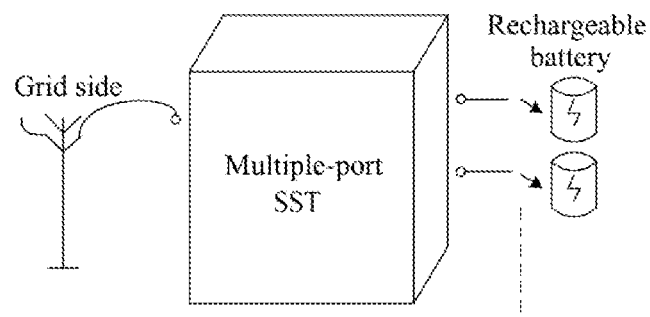
FIG. 3 is a schematic diagram of a power supply architecture of a charging station based on a multi-port SST shown in the present application.

According to the structure of the SST, it can be known that the second-stage DC-DC circuits of the SST are isolated with each other, so that isolated multiple charging ports can be formed to meet the requirement of simultaneous charging of different electric vehicles. FIG. 3 is a schematic diagram of a power supply architecture of a charging station based on a multi-port SST shown in the present application. As shown in FIG. 3, there is only one isolation from an AC medium-voltage grid to a vehicle, which greatly simplifies the entire power supply architecture and can simultaneously improve system efficiency and reduce system costs.

However, since different electric vehicles have different input voltages and power levels during charging, when multiple electric vehicles with different input voltages and different power levels are charged at a same time from different charging ports of a same charging station, different charging ports output different power for respective electric vehicles, which makes different charging ports obtain different input powers from a power supply according to needs, resulting in a DC link voltage balance problem. In addition, independent adjustment of port voltage is required for each charging port to cope with the difference in the battery voltage of each electric vehicle, and the battery voltage usually varies within a wide range.

In order to solve the above problems, in an embodiment of the present application, each cell in the SST includes a first-stage AC-DC circuit and a second-stage DC-DC circuit, the second-stage DC-DC circuit is a high-frequency isolated circuit, and an output of the second-stage DC-DC circuit is used for charging an electric vehicle. In this way, the second-stage DC-DC circuit of each cell can be designed to be of multiple outputs including at least two outputs. For example, a second-stage circuit of each cell includes two DC-DC circuits, so that one output therefrom is configured to be connected in parallel with one of outputs from other cells to form a power bus, which can also be used as a parallel port, and other outputs of the cell are configured as independent ports. Power flow of the one output in each cell configured to form the parallel port can be bidirectional. In this way, when power imbalance among multiple independent ports causes a DC link voltage balance problem, power regulating among cells is enabled through the parallel port, to reduce or eliminate the DC link voltage balance problem.

Figure 4:
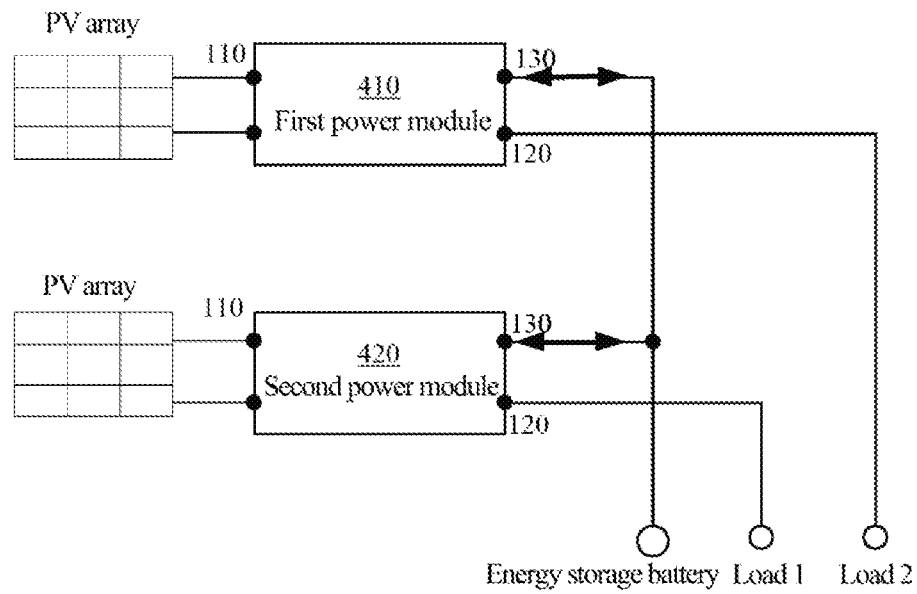
FIG. 4 is a schematic structural diagram of a power conversion system provided by an embodiment of the present application.

FIG. 4 is a schematic structural diagram of a power conversion system provided by an embodiment of the present application. The power conversion system in this embodiment includes N power modules, where N is a positive integer greater than or equal to 2, and the N power modules are connected in series at the input side.

In the N power modules, each power module includes a first port, a second port, and a third port.

In an implementation, as shown in FIG. 4, first ports of the N power modules are independent of each other, and each power module is electrically connected to an external device through the first port thereof. The external device can be, for example, a PV array, energy storage device, power grid, etc.

Figure 5:
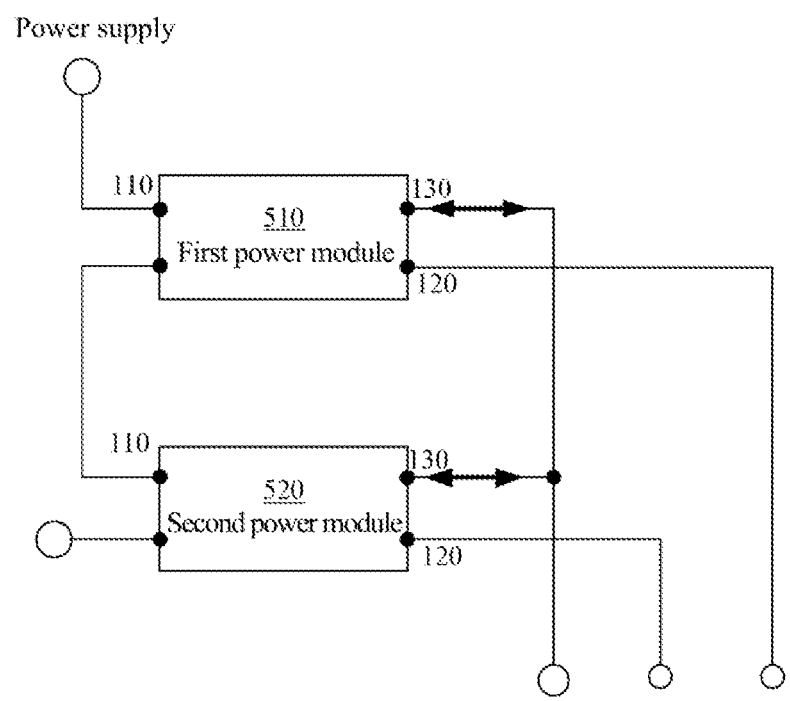
FIG. 5 is a schematic structural diagram of a power conversion system provided by another embodiment of the present application.

In an implementation, as shown in FIG. 5, the first ports of the N power modules are connected in series with each other, and in an implementation, the first ports of the N power modules are connected in series with each other and then connected to a same external device. The external device being a power supply is taken as an example for description. The power supply can be an AC power supply. For example, the first ports of the N power modules are connected in series with each other and then are connected to any of A phase, B phase, and C phase of a medium-voltage three-phase AC input. The external device can also be a DC power supply.

Second ports of the N power modules are independent output. Third ports of the N power modules are connected in parallel to form a power bus, and power flow of the third port of each power module is bidirectional.

Below, the power conversion system including two power modules is taken as an example for description.

As shown in FIG. 4, the power conversion system includes a first power module 410 and a second power module 420, and each power module includes a first port 110, a second port 120 and a third port 130. The first power module 410 is connected to a first external device (the first external device in FIG. 4 is a PV array) through the first port 110 of the first power module 410, and the second power module 420 is connected to a second external device (the second external device in FIG. 4 is a PV array) through the first port 110 of the second power module 420. It should be noted that the first external device and second external device can be different devices. For example, the first external device and second external device are two PV arrays respectively in FIG. 4. The first ports of the N power modules also can be connected in series with each other and then connected to a same external device, such as in the embodiment shown in FIG. 5.

The second port 120 of the first power module 410 and the second port 120 of the second power module 420 are in separate output as independent output ports.

The third port 130 of the first power module 410 and the third port 130 of the second power module 420 are connected in parallel to form a power bus. Moreover, as shown in FIG. 4, power flow at the third port 130 of each power module is bidirectional, that is, the power can either flow into the first power module 410 through the third port 130 of the first power module 410, or flow out of the first power module 410 through the third port 130 of the first power module 410. Similarly, the power can either flow into the second power module 420 through the third port 130 of the second power module 420, or flow out of the second power module 420 through the third port 130 of the second power module 420.

FIG. 4 shows an embodiment where the first ports of the power modules are in separate input, which is applied in household solar power supply occasions, and the parallel port being connected to an energy storage battery is taken as an example for description.

Without loss of generality, when power from the PV array flowing into the first port of the first power module is greater than load power of the second port thereof, excess power flows into the power bus through the third port thereof.

When the power from the PV array flowing into the first port of the second power module is less than the load power of the second port thereof, insufficient power is obtained from the power bus through the third port thereof. When total power of PV arrays of the power conversion system is greater than total load power, the energy storage battery is charged, and when the total PV power of the system is less than the total load power, the energy storage battery is discharged.

As shown in FIG. 5, the power conversion system includes a first power module 510 and a second power module 520, and each power module includes a first port 110, a second port 120, and a third port 130. For each power module, the first port 110 is configured as a power input port of the power module, and the second port 120 and third port 130 are configured as power output ports of the power module.

As shown in FIG. 5, the first port 110 of the first power module 510 and the first port 110 of the second power module 520 are connected in series with each other and electrically connected to a power supply.

The second port 120 of the first power module 510 and the second port 120 of the second power module 520 are in separate output as independent output ports.

The third port 130 of the first power module 510 and the third port 130 of the second power module 520 are connected in parallel to form a power bus. Moreover, as shown in FIG. 5, power flow at the third port 130 of each power module is bidirectional, that is, the power can either flow into the first power module 510 through the third port 130 of the first power module 510, or flow out of the first power module 510 through the third port 130 of the first power module 510. Similarly, the power can either flow into the second power module 520 through the third port 130 of the second power module 520, or flow out of the second power module 520 through the third port 130 of the second power module 520.

In the embodiments shown in FIG. 4 and FIG. 5, when loads of output port are imbalanced, the power bus formed by the third ports 130 connected in parallel realizes power regulating between multiple power modules, so that power input into the respective power modules through the first ports 110 is as equal as possible, to meet, in this case, the power requirements by different loads.

In the following embodiments of the present application, the first ports of all power modules being connected in series with each other and connected to an external device is taken as an example for description.

Figure 6:
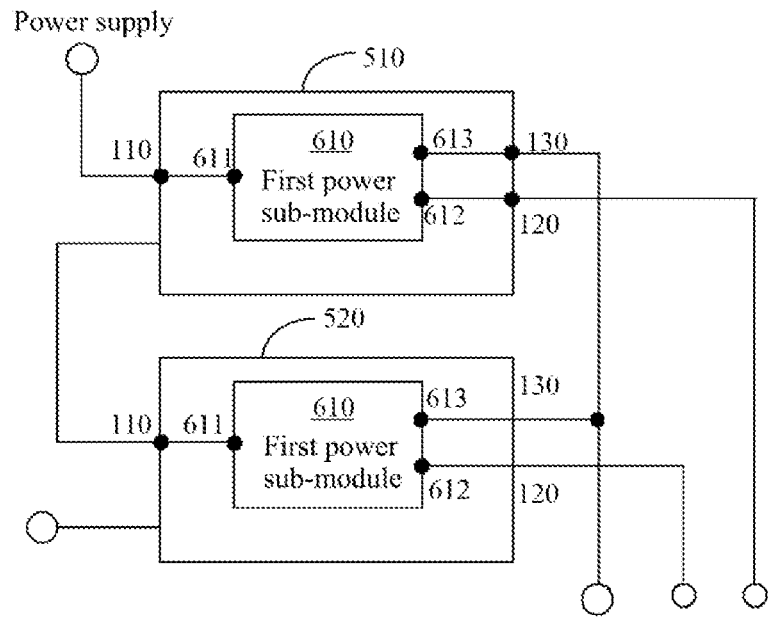
FIG. 6 is a schematic structural diagram of a power conversion system provided by yet another embodiment of the present application.

On the basis of the embodiment shown in FIG. 5, FIG. 6 is a schematic structural diagram of a power module provided by an embodiment of the present application. As shown in FIG. 6, each power module includes a first power sub-module 610. In each power module, a first end 611 of the first power sub-module 610 is electrically connected to the first port 110, a second end 612 of the first power sub-module 610 is electrically connected to the second port 120, and a third end 613 of the first power sub-module 610 is electrically connected to the third port 130. Moreover, power flow at the third end 613 of the first power sub-module 610 can be bidirectional.

Figure 7:
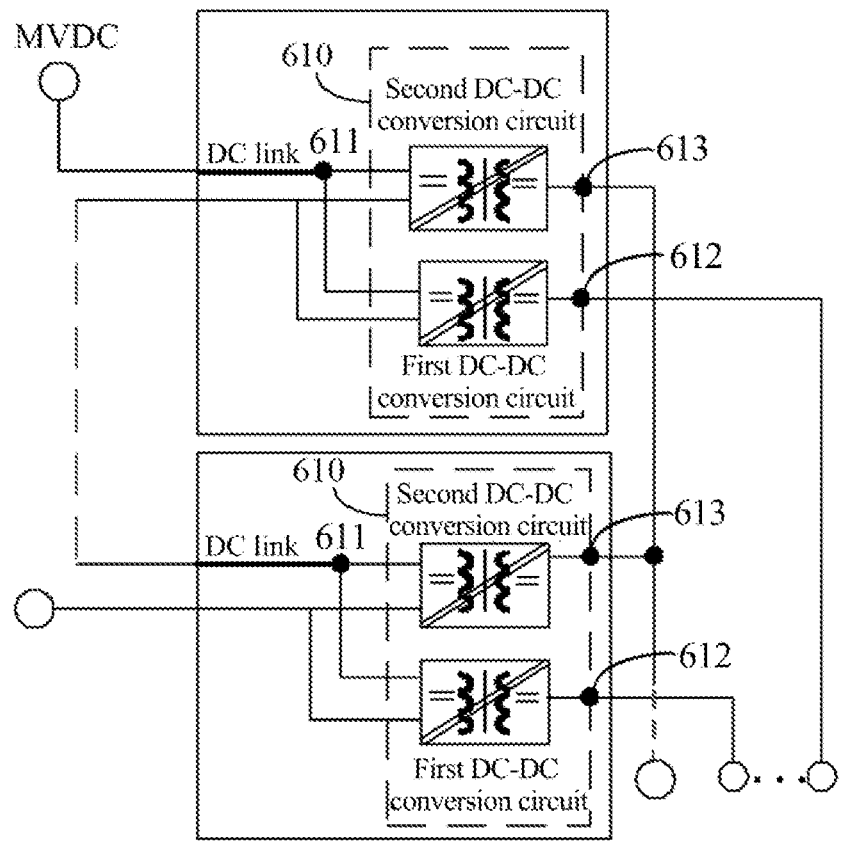
FIG. 7 is a schematic structural diagram of a power conversion system provided by yet another embodiment of the present application.

FIG. 7 is a schematic structural diagram of a power module provided by another embodiment of the present application. As shown in FIG. 7, based on the embodiment shown in FIG. 6, the first power sub-module 610 includes a first DC-DC conversion circuit and a second DC-DC conversion circuit, the first end 611 of the first power sub-module 610 is electrically connected to a first end of the first DC-DC conversion circuit and a first end of the second DC-DC conversion circuit, a second end of the first DC-DC conversion circuit is electrically connected to the second end 612 of the first power sub-module 610, and a second end of the second DC-DC conversion circuit is electrically connected to the third end 613 of the first power sub-module 610.

It should be noted that for the power modules shown in FIG. 7, the first port 110 of each power module can be directly connected to a DC power supply, and at this time, the first end of the first DC-DC conversion circuit and the first end of the second DC-DC conversion circuit are directly connected to the DC power supply. The input end of the first port 110 of each power module forms a DC link.

Figure 8:
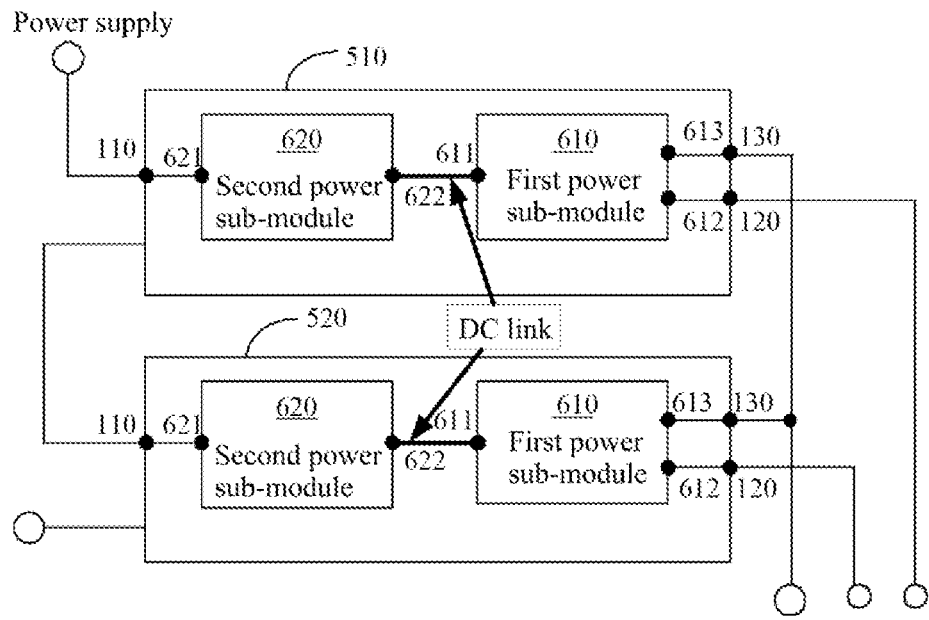
FIG. 8 is a schematic structural diagram of a power conversion system provided by yet another embodiment of the present application.

FIG. 8 is a schematic structural diagram of a power module provided by yet another embodiment of the present application. As shown in FIG. 8, on the basis of the embodiment shown in FIG. 6 and/or FIG. 7, each power module further includes a second power sub-module 620. In each power module, a first end 621 of the second power sub-module 620 is connected to the first port 110, and a second end 622 of the second power sub-module 620 is connected to the first end 611 of the first power sub-module 610, to also form a DC link.

The first DC-DC conversion circuit and the second DC-DC conversion circuit are not coupled to each other and are independent of each other, which, for example, operate at different switching frequencies. Since first ends of the first DC-DC conversion circuit and the second DC-DC conversion circuit are connected to the DC link, and the DC link is usually equipped with a large energy storage capacitor, when the power of the second end of one of the DC-DC circuits suddenly changes, the impact on the other DC-DC circuit is small. The output voltage of the first DC-DC conversion circuit and the output voltage of the second DC-DC conversion circuit are flexibly adjustable, and can be boosted or stepped down, and the two output voltages will not be restricted by each other. Moreover, the third ports are connected in parallel to directly form a high-power output port, which meets the needs of output power diversity. At the same time, the independent port is easy to expand by directly connecting a DC-DC conversion circuit to the DC link.

Figure 9A:
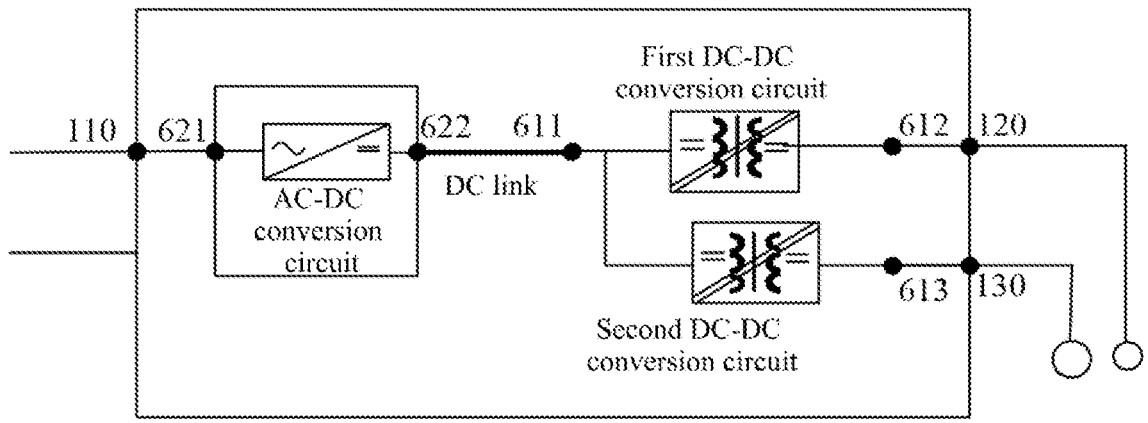
FIG. 9a is a schematic structural diagram of a power module provided by an embodiment of the present application.
Figure 9B:
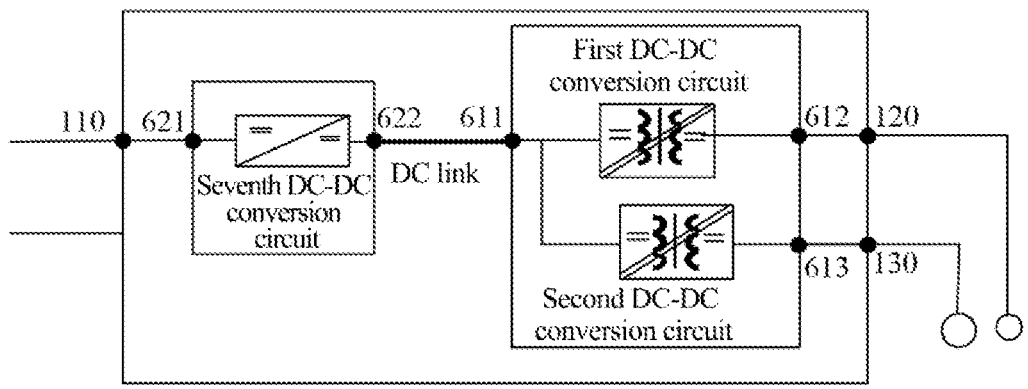
FIG. 9b is a schematic structural diagram of a power module provided by another embodiment of the present application.

FIG. 9a is a schematic structural diagram of a power module provided by another embodiment of the present application, and FIG. 9b is a schematic structural diagram of a power module provided by another embodiment of the present application. On the basis of the embodiment shown in FIG. 8, as shown in FIG. 9a, the second power sub-module 620 includes an AC-DC conversion circuit.

For the embodiment shown in FIG. 9a, a first end of the AC-DC conversion circuit is connected to the first end 621 of the second power sub-module 620, and a second end of the AC-DC conversion circuit is connected to the second end 622 of the second power sub-module 620.

Alternatively, as shown in FIG. 9b, the second power sub-module 620 includes a seventh DC-DC conversion circuit.

For the embodiment shown in FIG. 9b, a first end of the seventh DC-DC conversion circuit is connected to the first end 621 of the second power sub-module 620, and a second end of the seventh DC-DC conversion circuit is connected to the second end 622 of the second power sub-module 620.

When the second power sub-module 620 includes the AC-DC conversion circuit, the first port 110 of each power module can be connected to an AC power source. When the second power sub-module 620 includes the seventh DC-DC conversion circuit, the first port 110 of each power module can be directly connected to a DC power source.

Figure 10A:
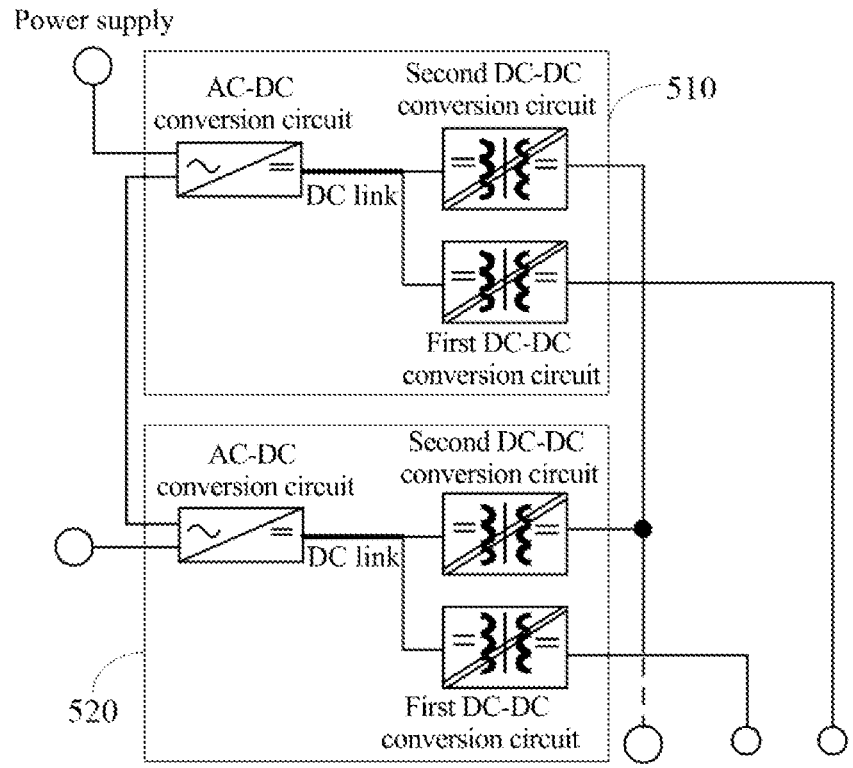
Figure 10B:
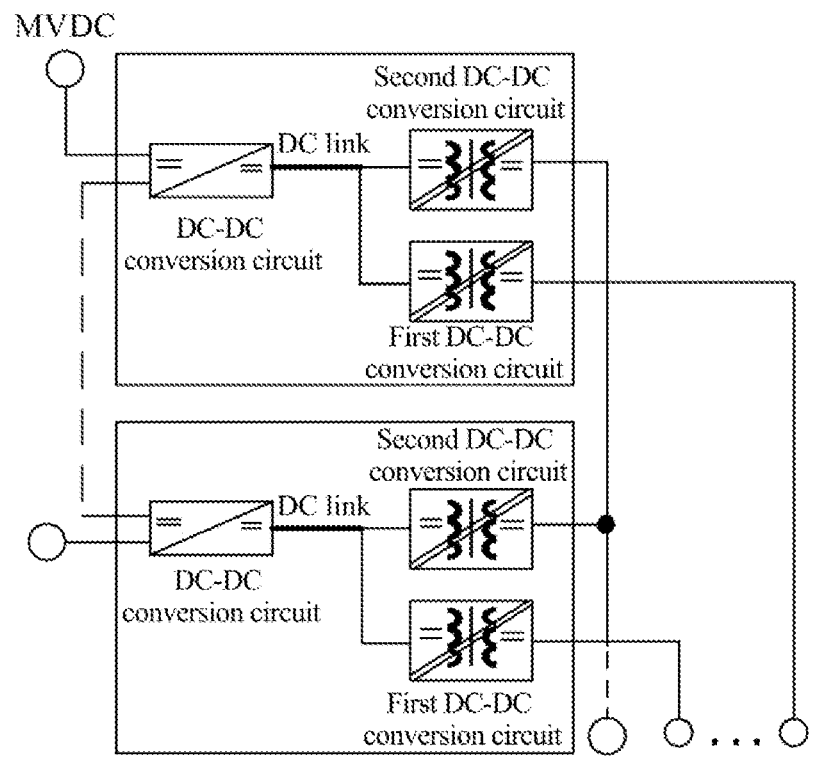
FIG. 10b is a schematic structural diagram of a power conversion system constituted by the power module shown in FIG. 9b.

FIG. 10a is a schematic structural diagram of a power conversion system constituted by the power module shown in FIG. 9a. FIG. 10b is a schematic structural diagram of a power conversion system constituted by the power module shown in FIG. 9b. In the power conversion system shown in FIG. 10a, the first port can be connected to an AC power source, and in the power conversion system shown in FIG. 10b, the first port can be connected to a DC power source.

Take the power conversion system shown in FIG. 10a as an example for description.

As shown in FIG. 10a, the first power module 510 and the second power module 520 respectively include an AC-DC conversion circuit, a first DC-DC conversion circuit and a second DC-DC conversion circuit. The AC-DC conversion circuit of the first power module 510 and the AC-DC conversion circuit of the second power module 520 are connected in series and then are connected to a power supply. Both an output of the first DC-DC conversion circuit of the first power module 510 and an output of the first DC-DC conversion circuit of the second power module 520 are independent ports. An output of the second DC-DC conversion circuit of the first power module 510 and an output of the second DC-DC conversion circuit of the second power module 520 are connected in parallel to form a power bus. As shown in FIG. 10a, the power bus is used for power regulating, and a parallel port is also provided to connect to the load; or the power bus is only used for power regulating, and at this time, the power bus does not have a parallel port.

In the below, taking FIGS. 11a-11c as an example, the power regulating of the power conversion system will be described.

Figure 11A:
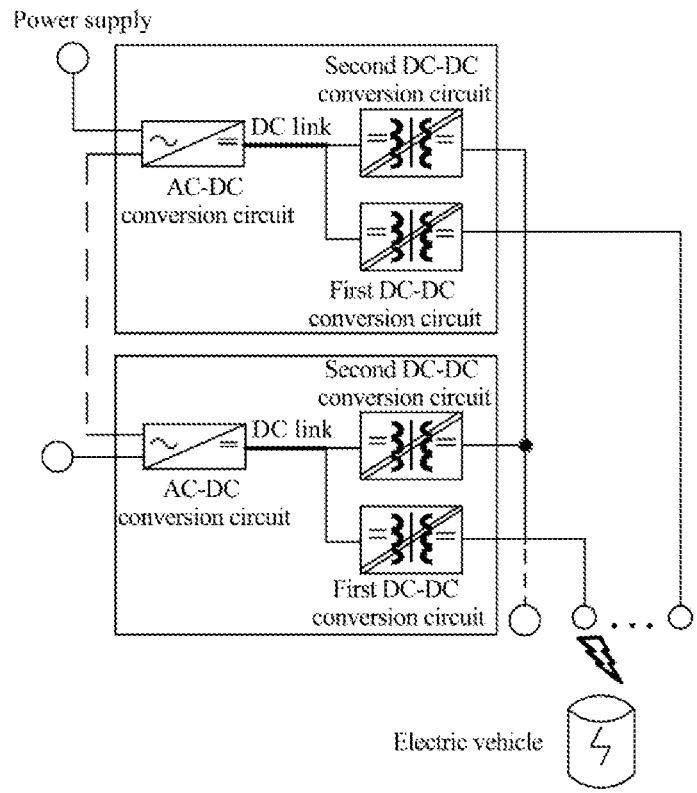
FIG. 11a is a schematic structural diagram of a power conversion system provided by yet another embodiment of the present application.

Embodiment 1: as shown in FIG. 11a, a power conversion system includes N power modules, an electric vehicle is charged through a charging port corresponding to an independent output port of an i-th power module, when there is no load on independent output ports and a parallel port of other power modules, it leads to imbalanced load and causes the DC link voltage balance problem.

At this time, for the power conversion system shown in the present embodiment, the N power modules obtain input power from the power supply through the first ports. Input power of the i-th power module flows through the first DC-DC conversion circuit and the second port 120 thereof to charge the electric vehicle. Input power obtained by other power modules flows to the power bus through the second DC-DC conversion circuits and the third ports 130 thereof. Power on the power bus flows through the third port 130 of the i-th power module to the second DC-DC conversion circuit of the i-th power module, and then flows through the first DC-DC conversion circuit and the second port 120 thereof to charge the electric vehicle. In this way, even if the loads of the power conversion system are imbalanced, the power conversion system is enabled to perform power regulating because power flow at the third port 130 in each power module can be bidirectional, which thus can also make input power obtained by each power module from the power supply tend to be equal.

Figure 11B:
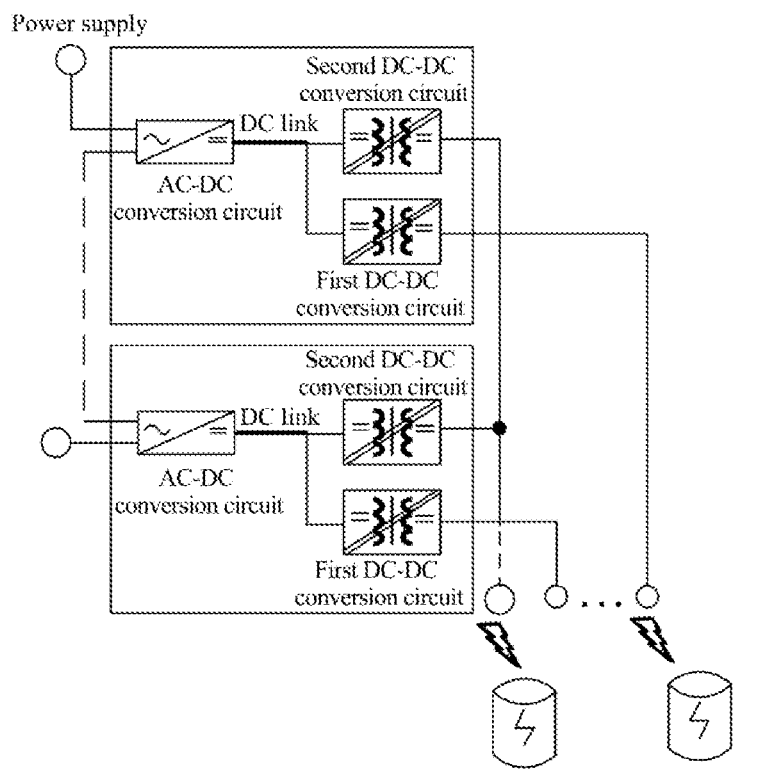
FIG. 11b is a schematic structural diagram of a power conversion system provided by yet another embodiment of the present application.

Embodiment 2: as shown in FIG. 11b, a power conversion system includes N power modules. An electric vehicle 1 is charged through a charging port corresponding to an independent output port of a j-th power module, and an electric vehicle 2 is charged through a charging port corresponding to the parallel port. When there is no load on independent output ports of other power modules, it leads to imbalanced load and causes the DC link voltage balance problem. For this embodiment, several cases may be considered as follows.

A first case: power provided for the electric vehicle 1 through a first port of the j-th power module cannot meet the charging demand thereof. At this time, input power of the j-th power module is used only to charge the electric vehicle 1 through the first DC-DC conversion circuit and the second port thereof, and input power obtained by the other power modules flows to the power bus through the second DC-DC conversion circuits and the third ports thereof. At this time, the power on the power bus not only charges the electric vehicle 2 through the parallel port, but also flows to the second DC-DC conversion circuit of the j-th power module through the third port of the j-th power module, and then joins the input power of the j-th power module to charge the electric vehicle 1 through the first DC-DC conversion circuit and the second port thereof.

A second case: the power provided for the electric vehicle 1 through the first port of the j-th power module just meets the charging demand thereof. At this time, the input power of the j-th power module is used only to charge the electric vehicle 1 through the first DC-DC conversion circuit and the second port thereof, and the input power obtained by other power modules flows to the power bus through the second DC-DC conversion circuits and the respective third ports thereof. At this time, the power on the power bus is used only to charge the electric vehicle 2 through the parallel port.

A third case: the power provided for the electric vehicle 1 through the first port of the j-th power module is greater than the charging demand of electric vehicle 1. At this time, the input power of the j-th power module not only is used to charge the electric vehicle 1 through the first DC-DC conversion circuit and the second port thereof, but also flows to the power bus through the second DC-DC conversion circuit and the third port thereof, and the input power obtained by the other power modules flows to the power bus through the second DC-DC conversion circuits and the respective third ports thereof. At this time, the power on the power bus is used only to charge the electric vehicle 2 through the parallel port.

Figure 11C:
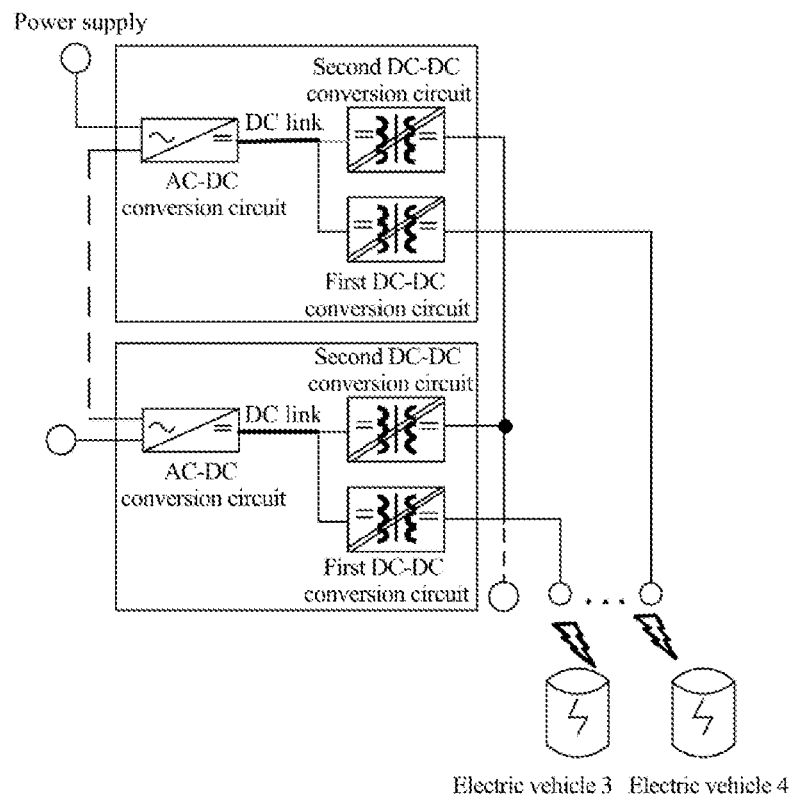
FIG. 11c is a schematic structural diagram of a power conversion system provided by yet another embodiment of the present application.

Embodiment 3: as shown in FIG. 11c, a power conversion system includes N power modules. An electric vehicle 3 is charged through a charging port corresponding to an independent output port of a u-th power module, and an electric vehicle 4 is charged through a charging port corresponding to an independent output port of a v-th power module. When there is no load on independent output ports of the other power modules and the parallel port, it will lead to imbalanced load and causes the DC link voltage balance problem. For this embodiment, several cases may be considered as follows.

A first case: power provided by a first port of one of the two power modules for the electric vehicle cannot meet the charging demand thereof, and power provided by a first port of the other power module for the electric vehicle just meets the charging demand thereof.

For example, power provided by the first port of the u-th power module for the electric vehicle 3 cannot meet the charging demand. At this time, input power of the u-th power module is used only to charge the electric vehicle 3 through the first DC-DC conversion circuit and the second port thereof, input power of the v-th power module is used only to charge the electric vehicle 4 through the first DC-DC conversion circuit and the second port thereof, and input power obtained by other power modules flows to the power bus through the second DC-DC conversion circuits and the respective third ports thereof. At this time, the power on the power bus flows to the second DC-DC conversion circuit of the u-th power module through the third port of the u-th power module, and then joins the input power of the u-th power module after flowing through the second DC-DC conversion circuit of the u-th power module to charge the electric vehicle 3 through the first DC-DC conversion circuit and the second port thereof.

A second case: power provided by a first port of one of the two power modules for the electric vehicle cannot meet the charging demand thereof, and power provided by a first port of the other power module for the electric vehicle is greater than the charging demand thereof.

For example, power provided by the first port of the u-th power module for the electric vehicle 3 cannot meet the charging demand thereof. At this time, input power of the u-th power module is used only to charge the electric vehicle 3 through the first DC-DC conversion circuit and the second port thereof, input power of the v-th power module not only is used to charge the electric vehicle 4 through the first DC-DC conversion circuit and the second port thereof, but also flows to the power bus through the second DC-DC conversion circuit and the third port thereof, and the input power obtained by other power modules flows to the power bus through the second DC-DC conversion circuits and the respective third ports thereof. At this time, the power on the power bus flows to the second DC-DC conversion circuit of the u-th power module through the third port of the u-th power module, and then joins the input power of the u-th power module after flowing through the second DC-DC conversion circuit of the u-th power module to charge the electric vehicle 3 through the first DC-DC conversion circuit and the second port thereof.

A third case: power provided by the two power modules for the electric vehicles through the respective first ports thereof both cannot meet the charging demand thereof respectively. At this time, input power of the u-th power module is used only to charge the electric vehicle 3 through the first DC-DC conversion circuit and the second port thereof, input power of the v-th power module is used only to charge the electric vehicle 4 through the first DC-DC conversion circuit and the second port thereof, and input power obtained by other power modules flows to the power bus through the second DC-DC conversion circuits and the respective third ports thereof.

At this time, part of the power on the power bus flows to the second DC-DC conversion circuit of the u-th power module through the third port of the u-th power module, and then joins the input power of the u-th power module after flowing through the second DC-DC conversion circuit of the u-th power module to charge the electric vehicle 3 through the first DC-DC conversion circuit and the second port thereof, which meets the charging requirements of the electric vehicle 3. Remaining power on the power bus flows to the second DC-DC conversion circuit of the v-th power module through the third port of the v-th power module, and then joins the input power of the v-th power module after flowing through the second DC-DC conversion circuit of the v-th power module to charge the electric vehicle 4 through the first DC-DC conversion circuit and the second port thereof, which meets the charging requirements of the electric vehicle 4.

Although the power conversion system in the above embodiments has a load imbalance problem, the power conversion system is enabled to perform a power regulating because the power flow at the third port 130 in each power module can be bidirectional, so that the input power obtained by each power module from the power supply is as equal as possible.

FIGS. 11*a*-11*c* shows that the power conversion system is applied to a scenario similar to a charging station. At this time, the power conversion system provides power to the outside, and the load imbalance is caused by the different power of the rechargeable devices connected to the charging ports. In addition, based on the inventive concept of the present application, the power conversion system can be applied to scenarios combined with energy storage, for example, energy storage charging stations, photovoltaic power plants, and it can also be applied to data centers, micro-grids and other occasions that require energy storage. Below, a photovoltaic power plant is taken as an example for description.

Power of the three-phase AC (the grid side) flows in from the photovoltaic (PV) arrays, and each cell is connected to an independent photovoltaic (PV) array, and each PV array independently takes control of distributed maximum power point tracking (MPPT) solar controller according to the amount of sunlight, thereby increasing the power generation. When a PV array is damaged, the PV array can be removed without affecting the normal operation of other PV arrays. It can be seen that input power of a port connected to the PV array is affected by the randomness of sunlight and breakdown, and thus there is also an imbalance in the input power (the power provided by each PV array to the grid side), which leads to the DC link voltage balance problem.

Figure 12:
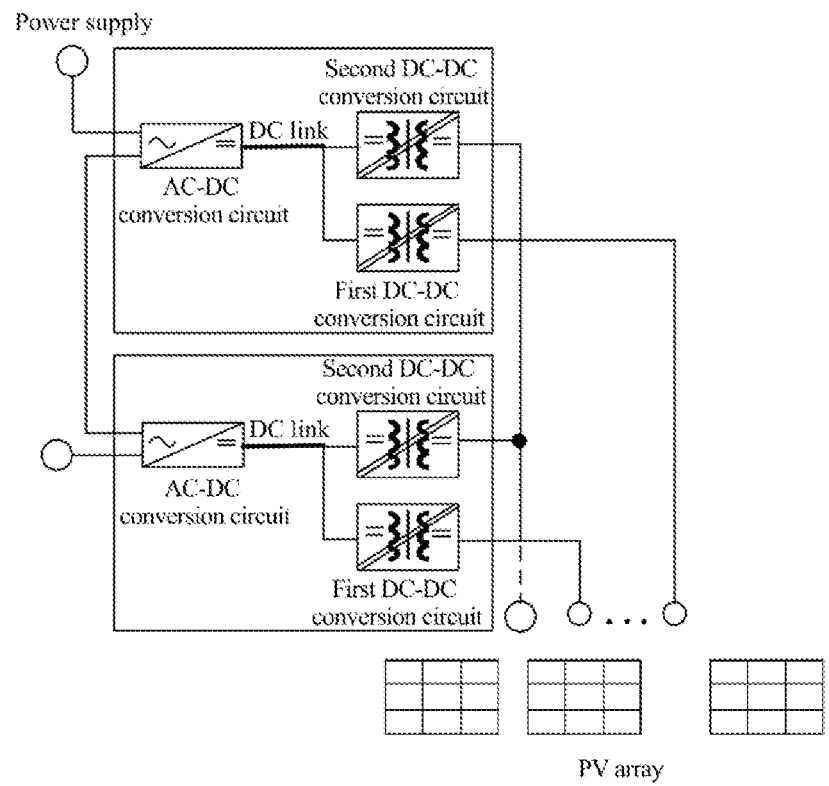
FIG. 12 is a schematic structural diagram of a power conversion system provided by yet another embodiment of the present application.

For the power conversion system shown in FIG. 12, the second port of each power module is connected to a PV array, and the second port of each power module is used to input power. However, due to the influence of sunlight or PV array failure etc., input power of two second ports is different, causing output power of the first ports of the two power modules to be unequal. At this time, a power regulating is performed through the third ports.

For example, input power of the second port of the first power module is less than input power of the second port of the second power module. That is, power provided by a PV array connected to the second port of the first power module is less than power provided by a PV array connected to the second port of the second power module. At this time, the input power at the second port of the second power module flows to the second power module through the second port of the second power module. A part of the input power flows to the power bus through the third port of the second power module, and then power on the power bus flows to the third port of the first power module and then flows to the first power module thereof, and joins the input power flowed from the second port of the first power module, and then flows into the grid side through the first port of the first power module. In this way, with the characteristics of the power flow at the third port of each power module that can be bidirectional, the third ports are connected in parallel to form a power bus, and when output powers of the first ports of the power modules are not equal, power balance regulating between the power modules is performed using the power bus and the third port of each power module, so that the output power of the first ports of all power modules in the power conversion system are equal, and the DC link voltage balance problem is solved.

It should be noted that in the power conversion system shown in FIG. 12, when the parallel input port is also connected to a PV array, if the output power of the first ports of two power modules are not equal, the power balance regulating between the power modules can also be performed using the power bus and the third port of each power module, which will not be repeated here.

Figure 13:
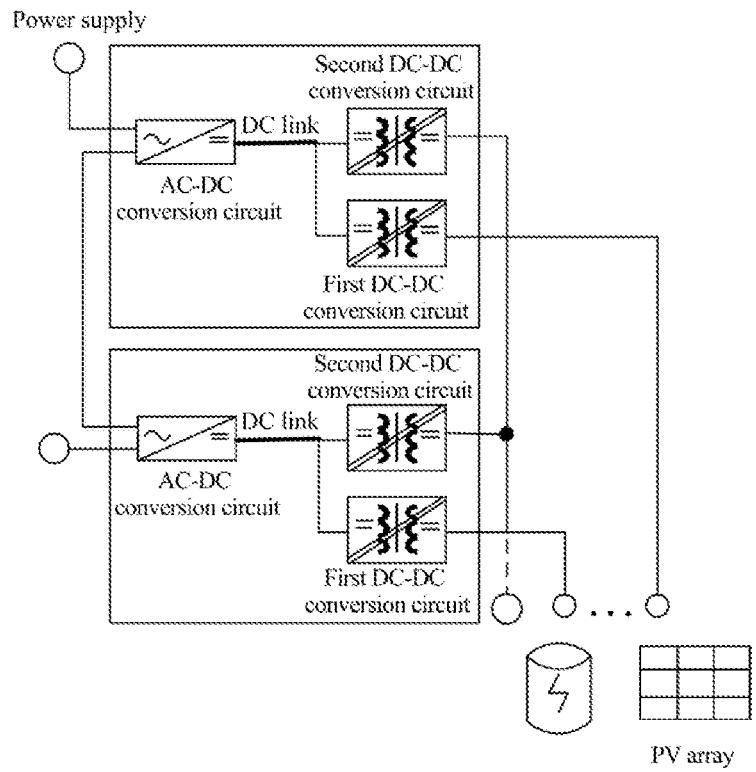
FIG. 13 is a schematic structural diagram of a power conversion system provided by yet another embodiment of the present application.

As shown in FIG. 13, among the independent ports and parallel port of the power conversion system, when a part of ports are connected to external loads and a part of ports are connected to power generating devices, that is, when a part of the second ports of the power modules in the power conversion system are used to input power to the power module and a part of the second ports of the power modules are used to output power from the power modules, if the DC links of the power modules are imbalanced, the inventive concept of the present application is also applicable, for example, as shown in FIG. 13.

FIG. 13 is a schematic structural diagram of a power conversion system provided by another embodiment of the present application. As shown in FIG. 13, one of two independent ports is connected to an external load and is called an independent output port, and the other is connected to a PV array and is called an independent input port.

At least part of power generated by the PV array is transferred to the second port of the first power module 510, flows into the power bus through the third port of the first power module 510, then flows into the second power module 520 through the third port of the second power module 520, and finally flows to the independent output port through the second port of the second power module 520 to charge the external load.

In an embodiment, the independent port and parallel port (if a port is provided on the power bus) of each power module in the power conversion system can also be connected to an energy storage apparatus.

When all energy storage apparatuses connected to the power conversion system are used to store energy, that is, when the energy storage apparatuses obtain energy from the power supply, reference for the power regulating can be made to the description of power regulating when the power conversion system charges an external load, which will not be repeated here.

When all the energy storage apparatuses connected to the power conversion system are used to release energy, that is, when the energy storage apparatuses provide energy to the outside, for example, the grid side, reference for the power regulating can be made to the description of the power conversion system connected to a PV array, which will not be repeated here.

Figure 14:
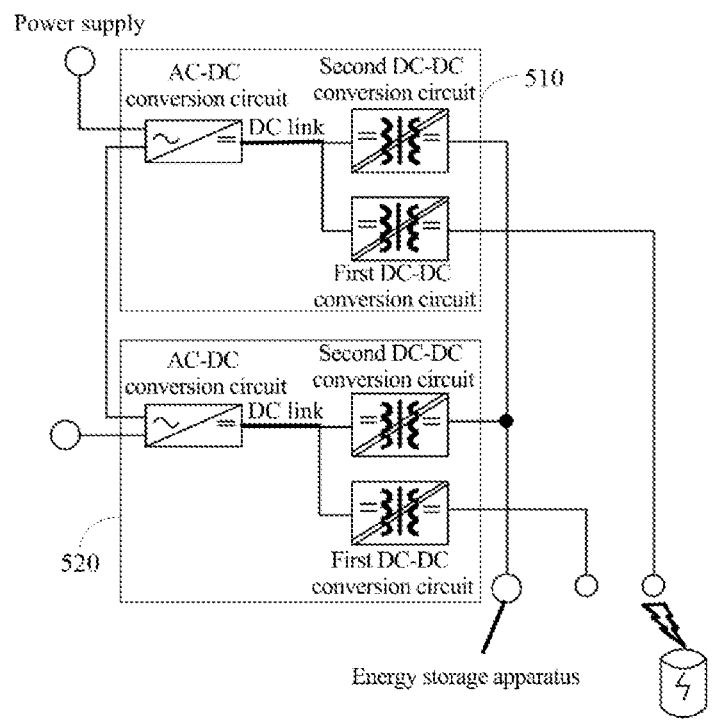
FIG. 14 is a schematic structural diagram of a power conversion system provided by yet another embodiment of the present application.

As shown in FIG. 14, in an embodiment, for the independent port and parallel port (if a port is provided on the power bus) of each power module in the power conversion system, some of the ports can be connected to an energy storage apparatus, and some of the ports can be used to charge an external load, such as an electric vehicle.

In FIG. 14, the parallel port is connected to the energy storage apparatus, and the independent output port of the first power module 510 is used to charge the electric vehicle. At this time, if the energy storage apparatus releases energy, power output by the energy storage apparatus flows to the third port of the first power module 510 through the power bus, then flows to the first DC-DC circuit of the first power module 510 through the second DC-DC circuit of the first power module 510, and finally charges the electric vehicle through the first DC-DC circuit and the second port of the first power module 510. In this way, with the characteristics of the power flow at the third port of the power module that can be bidirectional, the energy released by the energy storage apparatus is provided to charge the external load, without the need for a power supply to charge the external load.

If the energy storage apparatus stores energy, the energy storage apparatus and the external load are provided with energy through the power supply. At this time, since the energy storage apparatus stores energy, the energy storage apparatus is equivalent to an external load. At this time, reference for the power regulating can be made to the description of power regulating when the power conversion system charges the external loads, which will not be repeated here.

Figure 15:
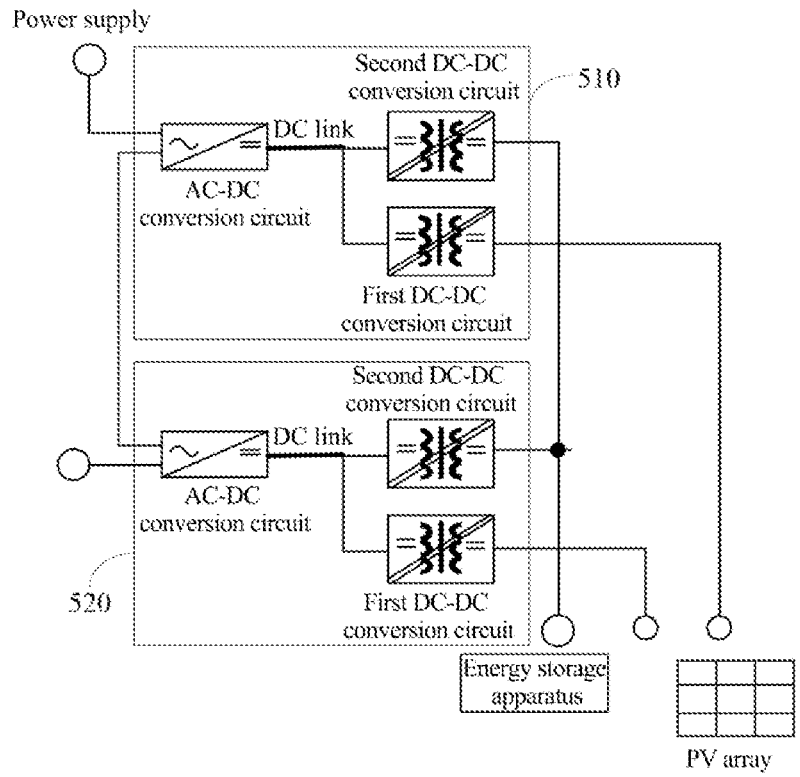
FIG. 15 is a schematic structural diagram of a power conversion system provided by yet another embodiment of the present application.

As shown in FIG. 15, in an embodiment, for the independent port and parallel port (if a port is provided on the power bus) of each power module in the power conversion system, some of the ports can be connected to an energy storage apparatus, and some of the ports are connected to a PV array.

In FIG. 15, the parallel port is connected to the energy storage apparatus, and the independent output port of the first power module 510 is connected to the PV array. If the energy storage apparatus releases energy, and the PV array supplies power to the grid side, since the energy storage apparatus releases energy, the role of the energy storage apparatus is the same as that of the PV array, supplying power to the grid side. At this time, reference for the power regulating can be made to the description of the power conversion system connected to the PV array, which will not be repeated here.

If the energy storage apparatus stores energy, power generated by the PV array flows into the first DC-DC circuit through the second port of the first power module 510, then flows to the second DC-DC circuit of the first power module 510, and finally flows into the power bus through the third port of the first power module 510 to provide energy for the energy storage apparatus. In this way, with the characteristics of the power flow at the third port of the power module that can be bidirectional, the energy generated by the PV array is provided to the energy storage apparatus, without the need for a power supply to charge an external load.

It should be noted that FIGS. 11*a*-15 only shows a case where the power conversion system includes two power modules. When the power conversion system includes more power modules, power balance regulating among the power modules can also be performed using the power bus and the third port of each power module, which will not be repeated here.

Based on the inventive concept of the present application, the structure of the power conversion system may have further inclusions.

Figure 16:
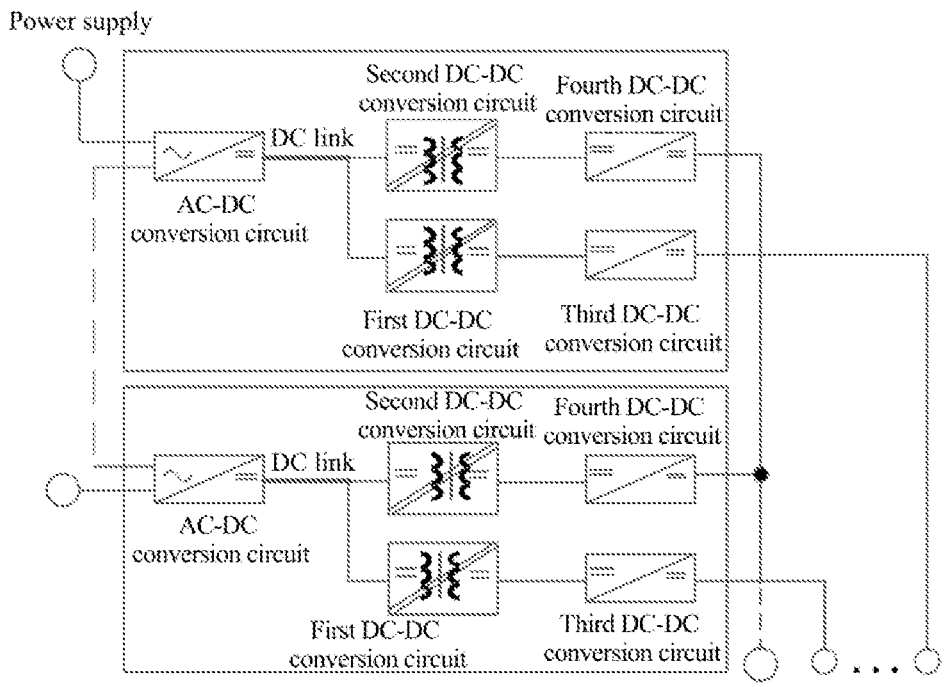
FIG. 16 is a schematic structural diagram of a power conversion system provided by yet another embodiment of the present application.

FIG. 16 is a schematic structural diagram of a power conversion system provided by yet another embodiment of the present application. As shown in FIG. 16, each power module includes a third DC-DC conversion circuit and/or a fourth DC-DC conversion circuit. The second end of the first power sub-module is electrically connected to the second port through the third DC-DC conversion circuit, and the third end of the first power sub-module is electrically connected to the third port through the fourth DC-DC conversion circuit.

In this embodiment, as shown in FIG. 16, the first power sub-module including the first DC-DC conversion circuit and the second DC-DC conversion circuit is taken as an example for description. Then, the second end of the first DC-DC conversion circuit is connected to the second port through the third DC-DC conversion circuit, and the second end of the second DC-DC conversion circuit is connected to the third port through the fourth DC-DC conversion circuit.

Figure 17:
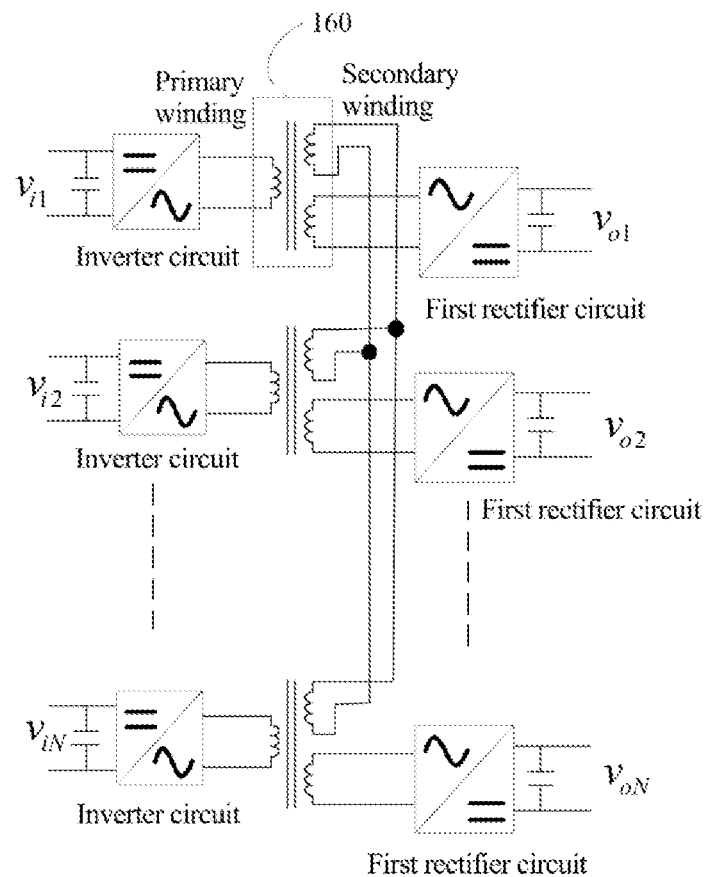
FIG. 17 is a schematic structural diagram of a first power sub-module provided by an embodiment of the present application.

In some embodiments, the first power sub-module 610 of each power module includes a multi-winding transformer, where the structure of the multi-winding transformer is as shown in FIG. 17. A multi-winding transformer 160 includes a primary winding, a first secondary winding and a second secondary winding. In each power module, the first end of the first power sub-module is electrically connected to the primary winding, the second end of the first power sub-module is electrically connected to the first secondary winding through a first rectifier circuit, and the third end of the first power sub-module is electrically connected to the second secondary winding.

As shown in FIG. 17, in an implementation, the first end of the first power sub-module is electrically connected to the primary winding through an inverter circuit. $v_{i1}$ to $v_{iN}$ are voltages of the DC link.

The first secondary winding of the multi-winding transformer 160 is connected to the second end of the first power sub-module through the first rectifier circuit, and the second end of the first power sub-module is connected to the second port. $v_{o1}$ to $v_{oN}$ are voltages of the second ports.

The second secondary winding of the multi-winding transformer 160 is connected to the third end of the first power sub-module, and the third end of the first power sub-module is connected to the third port. In an implementation, the second secondary winding can be directly connected to the third end of the first power sub-module.

It should be noted that in N power modules shown in FIG. 17, for the first power sub-module, the secondary windings connected to the third port are connected in parallel to form a power bus, but the power bus is not connected to any device such as a load or an energy storage apparatus, which is thus used for power regulating among the power modules to solve the DC link voltage balance problem caused by the power imbalance of independent ports. Since the regulated power only needs to pass through the secondary winding of the transformer, overall loss of the system is less affected and efficiency is higher. At the same time, since only an additional secondary winding is required to realize the power regulating, cost is low. In addition, a parallel port can also be set on the power bus to connect to other device such as a load or an energy storage apparatus.

Figure 18:
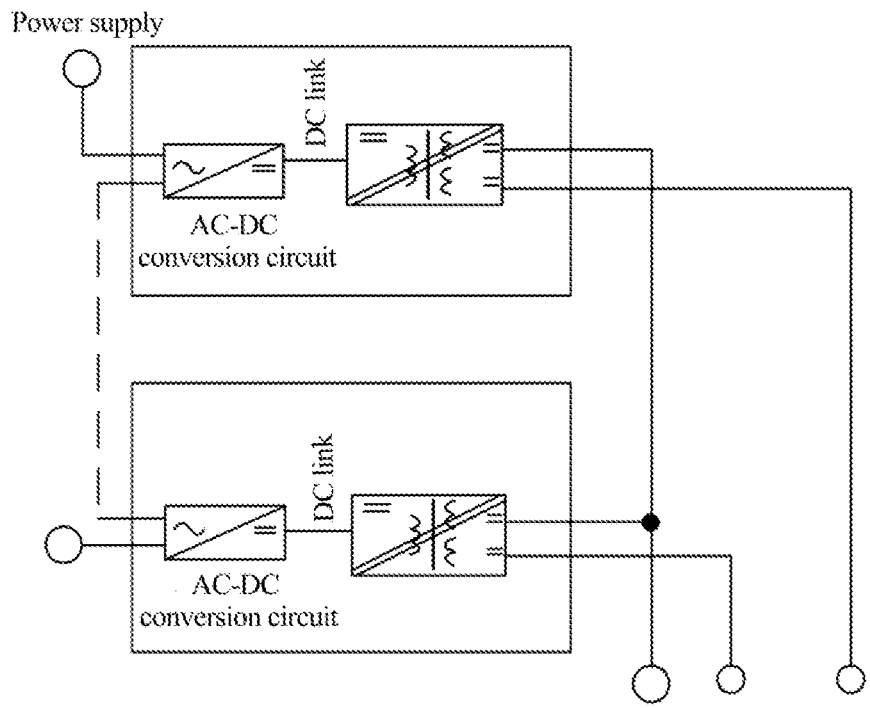
FIG. 18 is a schematic structural diagram of a power conversion system provided by yet another embodiment of the present application.

FIG. 18 is a schematic structural diagram of a power conversion system provided by yet another embodiment of the present application. As shown in FIG. 18, each power module includes a multi-winding transformer. In FIG. 18, a first secondary winding of the multi-winding transformer is connected to the second end of the first power sub-module through a first rectifier circuit, and a second secondary winding is connected to the third end of the first power sub-module through a second rectifier circuit. The second end and third end of the first power sub-module are directly electrically connected to the second port and third port of the power module, respectively.

It should be noted that for the power conversion system shown in FIG. 18, the third ports of N power modules are connected in parallel to form a power bus, and the power bus is provided with a parallel port. Therefore, the power bus not only can be used for power regulating among power modules to solve the DC link voltage balance problem caused by the load imbalance of independent ports, but also can be used as a power output port to charge an external load (e.g., an electric vehicle). In some embodiments, the power bus can also be used only for power regulating among power modules, without the parallel port.

It should be noted that in FIG. 18, the rectifier circuits respectively connected to the two secondary windings are not separately shown.

Figure 19:
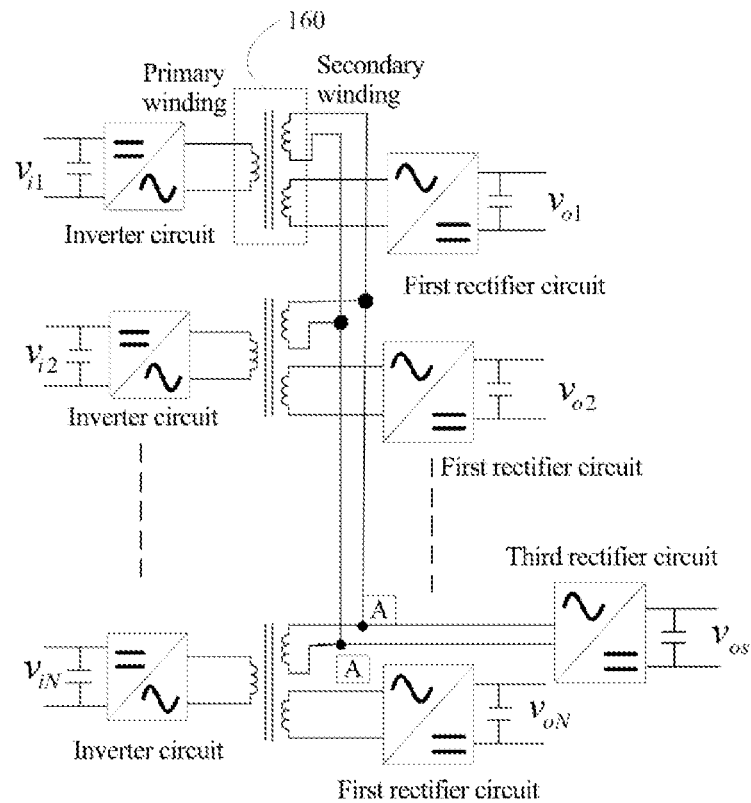
FIG. 19 is a schematic structural diagram of a first power sub-module provided by another embodiment of the present application.

FIG. 19 is a schematic structural diagram of a first power sub-module provided by another embodiment of the present application. The first power sub-module shown in FIG. 19 is similar to the first power sub-module shown in FIG. 17. FIG. 19 is different from FIG. 17 in that a parallel port is set on the power bus. After the third ports of the N power modules forms a parallel connection point (point A in FIG. 19), it is connected to the parallel port through a third rectifier circuit.

Figure 20:
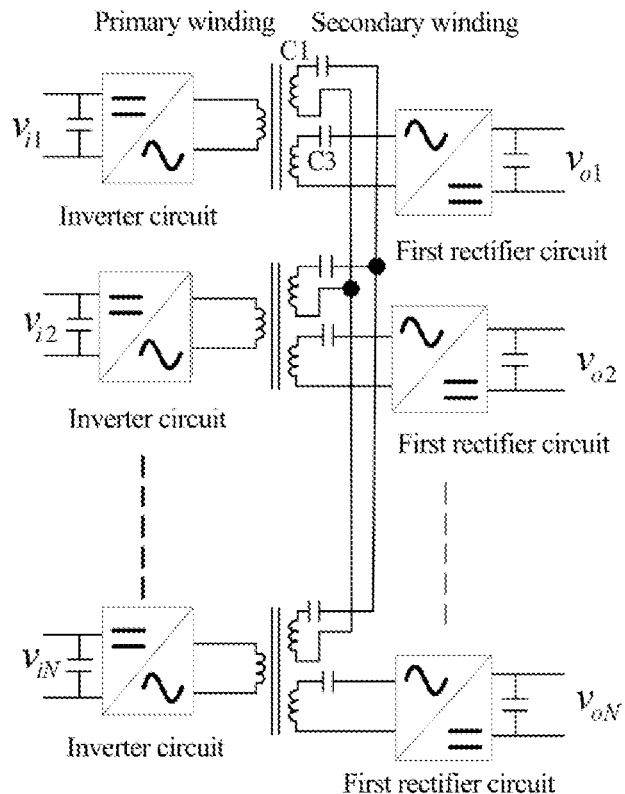
FIG. 20 is a schematic structural diagram of a first power sub-module provided by yet another embodiment of the present application.

In order to make the power regulating of the power conversion system easier to implement, as shown in FIG. 20, the third end of the first power sub-module can be connected to one of the two secondary windings through a first impedance adjustment circuit, and/or the second end of the first power sub-module is electrically connected to the other of the two secondary windings through a second impedance adjustment circuit. The first impedance adjustment circuit and the second impedance adjustment circuit adjust the consistency in output impedance of transformers in different power modules to make the power regulating of the power conversion system easier to implement.

In an implementation, the first impedance adjustment circuit includes a first capacitor C1.

In an implementation, the first impedance adjustment circuit includes a second capacitor C2 and a first inductor L1, or the second capacitor C2 and the first inductor L1 are connected in series.

In an implementation, the second impedance adjustment circuit includes a third capacitor C3.

In an implementation, the second impedance adjustment circuit includes a fourth capacitor C4 and a second inductor L2, or the fourth capacitor C4 and the second inductor L2 are connected in series.

The first impedance adjustment circuit shown in FIG. 20 includes the first capacitor C1, the second impedance adjustment circuit includes the third capacitor C3, and the capacitors C1 and C3 make the power regulating of the power conversion system easier to implement by adjusting the consistency in the output impedance of transformers in different power modules.

Figure 21:
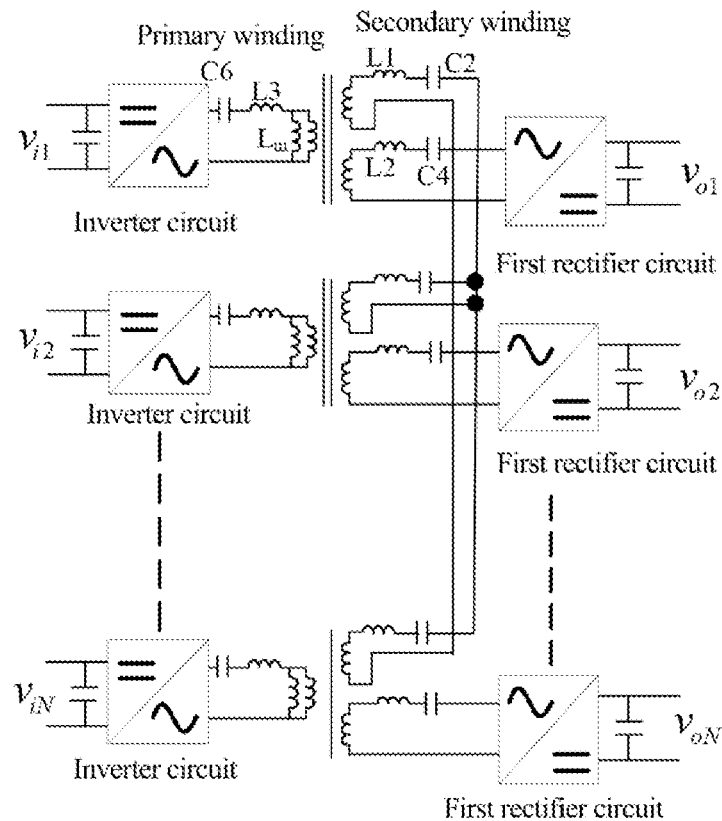
FIG. 21 is a schematic structural diagram of a first power sub-module provided by yet another embodiment of the present application.

In an embodiment, as shown in FIG. 21, the primary winding is electrically connected to the first end of the first power sub-module through a third impedance adjustment circuit.

In an implementation, the third impedance adjustment circuit includes a fifth capacitor C5.

In an implementation, the third impedance adjustment circuit includes a sixth capacitor C6 and a third inductor L3, or the sixth capacitor C6 and the third inductor L3 are connected in series.

The first impedance adjustment circuit shown in FIG. 21 includes the second capacitor C2 and the first inductor L1, the second impedance adjustment circuit includes the fourth capacitor C4 and the second inductor L2, and the third impedance adjustment circuit includes the sixth capacitor C6 and the third inductor L3.

It should be noted that the first impedance adjustment circuit in FIG. 20 can be replaced with the first impedance adjustment circuit shown in FIG. 21, and/or the second impedance adjustment circuit in FIG. 20 can be replaced with the second impedance adjustment circuit shown in FIG. 21. Similarly, the first impedance adjustment circuit in FIG. 21 can be replaced with the first impedance adjustment circuit shown in FIG. 20, and/or the second impedance adjustment circuit in FIG. 21 can be replaced with the second impedance adjustment circuit shown in FIG. 20.

Figure 22:
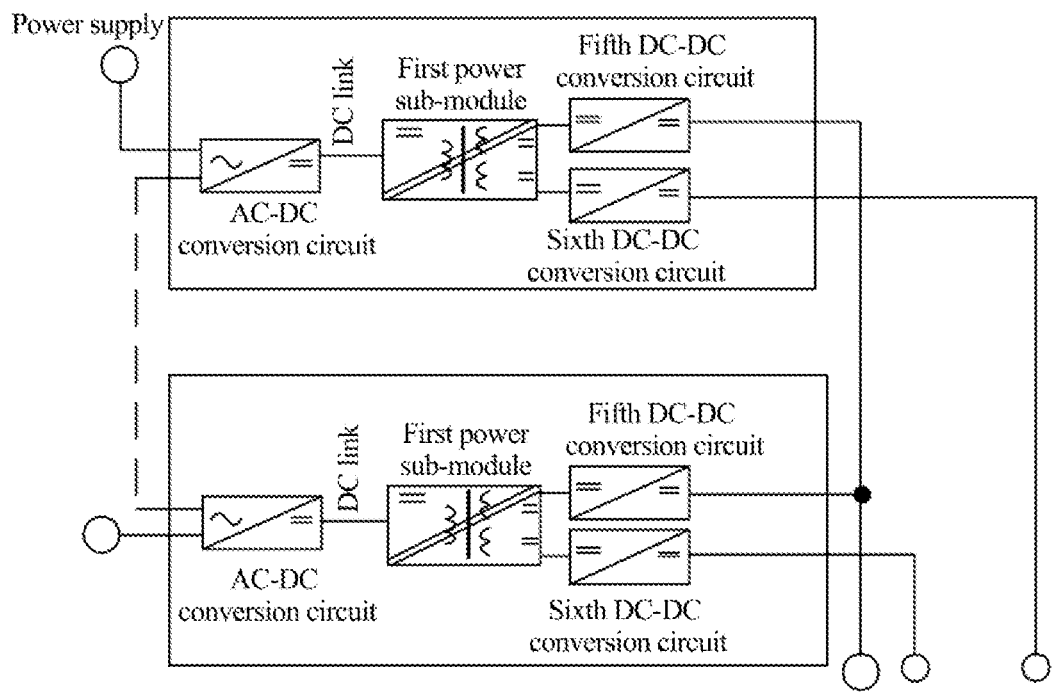
FIG. 22 is a schematic structural diagram of a power conversion system provided by yet another embodiment of the present application.

FIG. 22 is a schematic structural diagram of a power conversion system provided by yet another embodiment of the present application. As shown in FIG. 22, on the basis of each power module including the first power sub-module shown in FIG. 18, each power module further includes: a fifth DC-DC conversion circuit and a sixth DC-DC conversion circuit. The third end of the first power sub-module is connected to the third port through the fifth DC-DC conversion circuit.

It should be noted that FIG. 22 can be expanded based on the power conversion system shown in any of the above embodiments.

In an implementation, as shown in FIG. 22, each power module may further include the sixth DC-DC conversion circuit, and the second end of the first power sub-module is connected to the second port through the sixth DC-DC conversion circuit.

In an embodiment, in the power conversion system shown in FIG. 22, the first power sub-module adopts a multi-port DC-DC conversion circuit which is respectively connected to the second port and the third port of the power module through Buck circuit, which combines with the AC-DC conversion circuit to form a three-stage conversion circuit for the power module. The multi-port DC-DC conversion circuit achieves isolation among output ports, with each output port being connected to a Buck circuit to achieve a wide range of voltage output.

Figure 23:
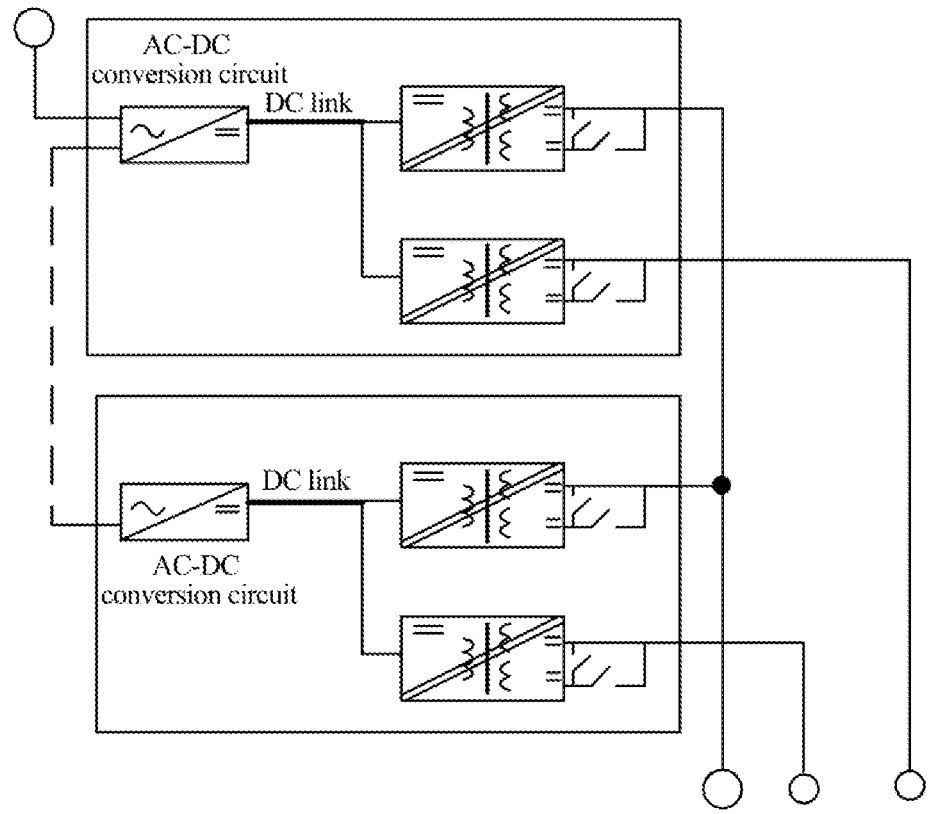
FIG. 23 is a schematic structural diagram of a power conversion system provided by yet another embodiment of the present application.

It should be noted that, on the basis of the power conversion system shown in FIG. 18, a series-parallel switching circuit can also be set to connect to the first power sub-module, as shown in FIG. 23, to achieve a wide range of output.

Figure 24:
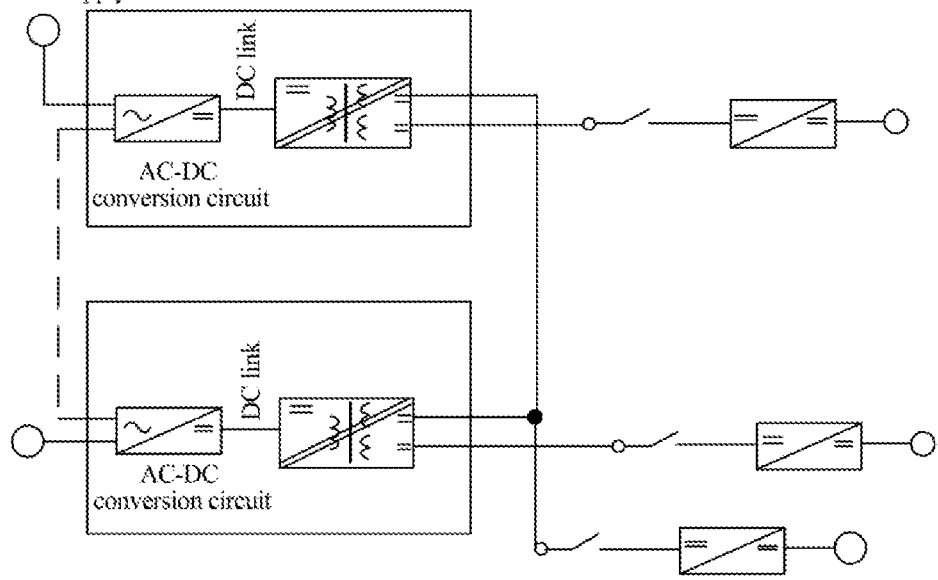
FIG. 24 is a schematic structural diagram of a power conversion system provided by another embodiment of the present application.

In some embodiments, the Buck circuit can also be independent of the power module, for example, as shown in FIG. 24, which facilitates Buck modularization, and allows users to expand as needed.

Figure 25:
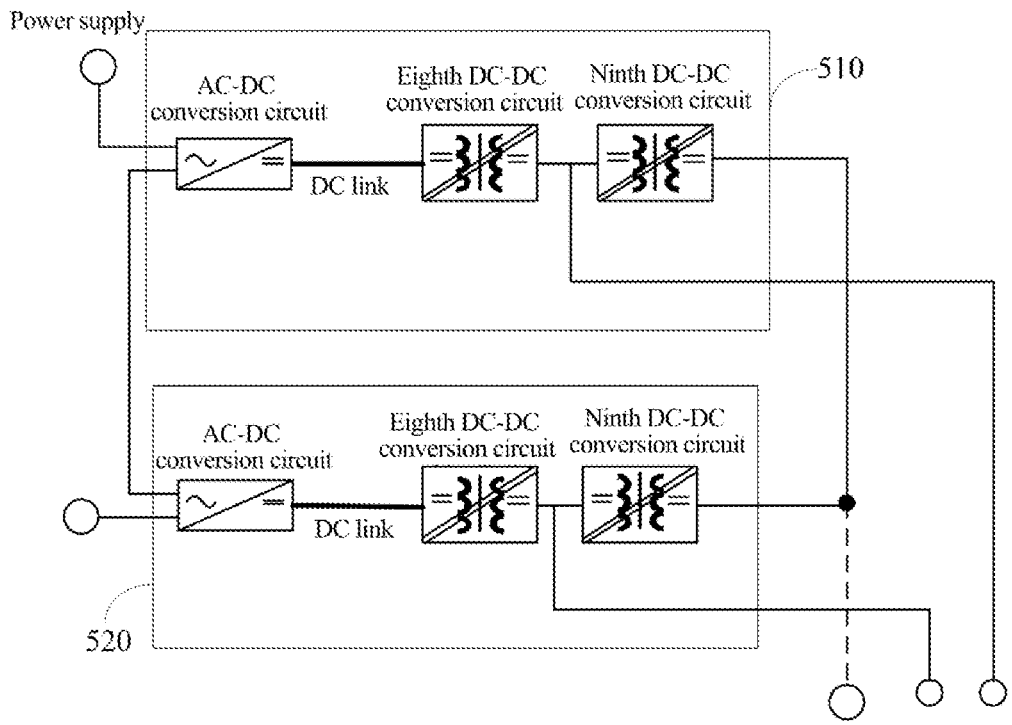
FIG. 25 is a schematic structural diagram of a power conversion system provided by yet another embodiment of the present application.

FIG. 25 is a schematic structural diagram of a power conversion system provided by yet another embodiment of the present application. As shown in FIG. 25, the first power sub-module includes an eighth DC-DC conversion circuit and a ninth DC-DC conversion circuit.

The first end of the first power sub-module is electrically connected to a first end of the eighth DC-DC conversion circuit, a second end of the eighth DC-DC conversion circuit is electrically connected to the second end of the first power sub-module, a first end of the ninth DC-DC conversion circuit is electrically connected to the second end of the eighth DC-DC conversion circuit, and a second end of the ninth DC-DC conversion circuit is electrically connected to the third end of the first power sub-module.

Figure 26:
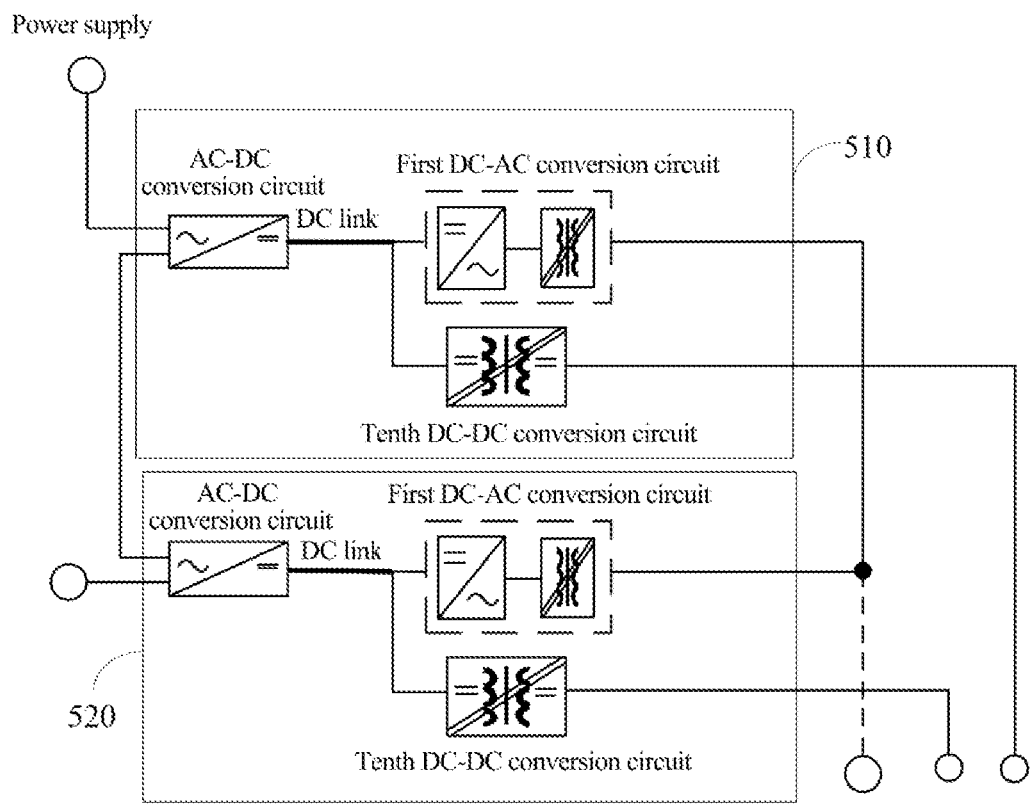
FIG. 26 is a schematic structural diagram of a power conversion system provided by yet another embodiment of the present application.

FIG. 26 is a schematic structural diagram of a power conversion system provided by yet another embodiment of the present application. As shown in FIG. 26, the first power sub-module includes a tenth DC-DC conversion circuit and a first DC-AC conversion circuit.

The first end of the first power sub-module is electrically connected to a first end of the tenth DC-DC conversion circuit, a second end of the tenth DC-DC conversion circuit is electrically connected to the second end of the first power sub-module, a first end of the first DC-AC conversion circuit is electrically connected to the first end of the first power sub-module, and the first DC-AC conversion circuit includes a transformer having a secondary winding electrically connected to the third end of the first power sub-module.

Figure 27:
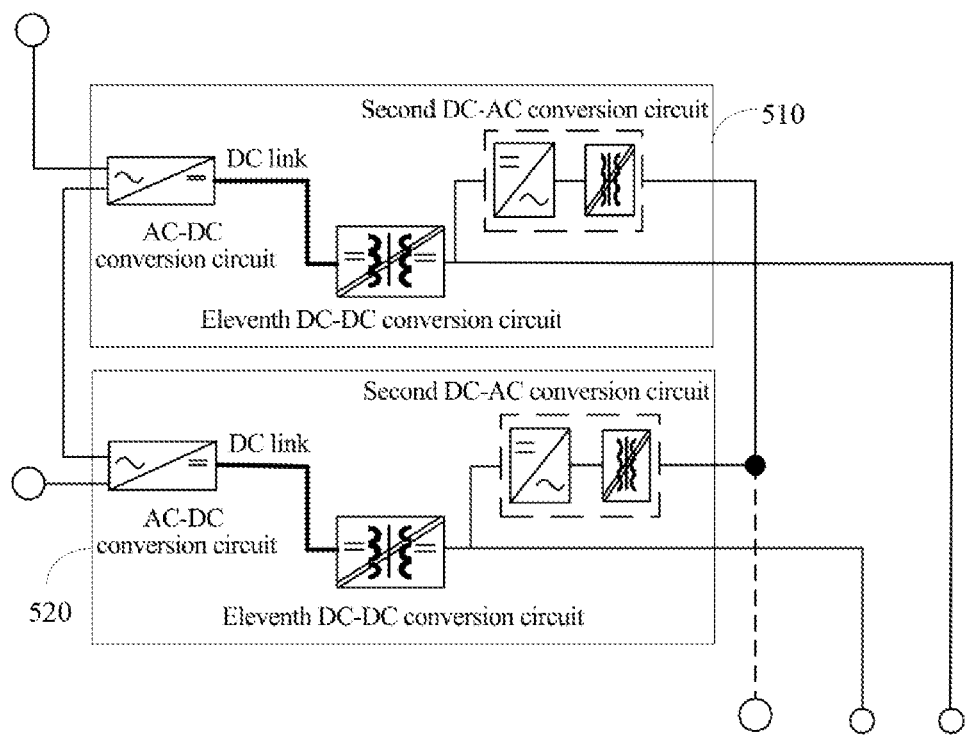
FIG. 27 is a schematic structural diagram of a power conversion system provided by yet another embodiment of the present application.

FIG. 27 is a schematic structural diagram of a power conversion system provided by yet another embodiment of the present application. As shown in FIG. 27, the first power sub-module includes an eleventh DC-DC conversion circuit and a second DC-AC conversion circuit.

The first end of the first power sub-module is electrically connected to a first end of the eleventh DC-DC conversion circuit, a second end of the eleventh DC-DC conversion circuit is electrically connected to the second end of the first power sub-module; and a first end of the second DC-AC conversion circuit is electrically connected to the second end of the first power sub-module, and the second DC-AC conversion circuit includes a transformer having a secondary winding electrically connected to the third end of the first power sub-module.

Figure 28:
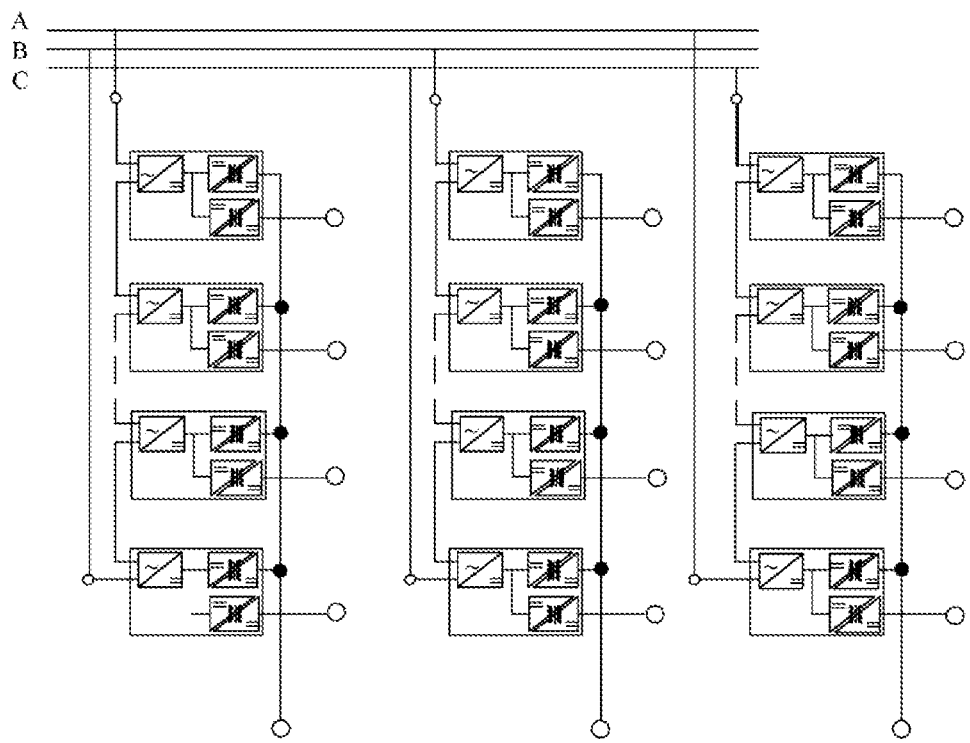
FIG. 28 is a schematic structural diagram of a three-phase power conversion system shown in an embodiment of the present application.

This application provides a three-phase power conversion system, where each phase of the three-phase power conversion system includes multiple power conversion systems, and each power conversion system may be the power conversion system shown in any of the above embodiments. The three-phase power conversion system can be a three-phase three-wire or three-phase four-wire system. The three-phase three-wire system can further be a Delta connection or star connection system. FIG. 28 is a schematic diagram of a three-phase Delta connection power conversion system.

As shown in FIG. 28, the input is of a Delta connection. At least one power conversion system in at least three power conversion systems belongs to a first phase power conversion system in the three-phase power conversion system, at least one power conversion system in the at least three power conversion systems belongs to a second phase power conversion system in the three-phase power conversion system, and at least one power conversion system in the at least three power conversion systems belongs to a third phase power conversion system in the three-phase power conversion system.

Figure 29:
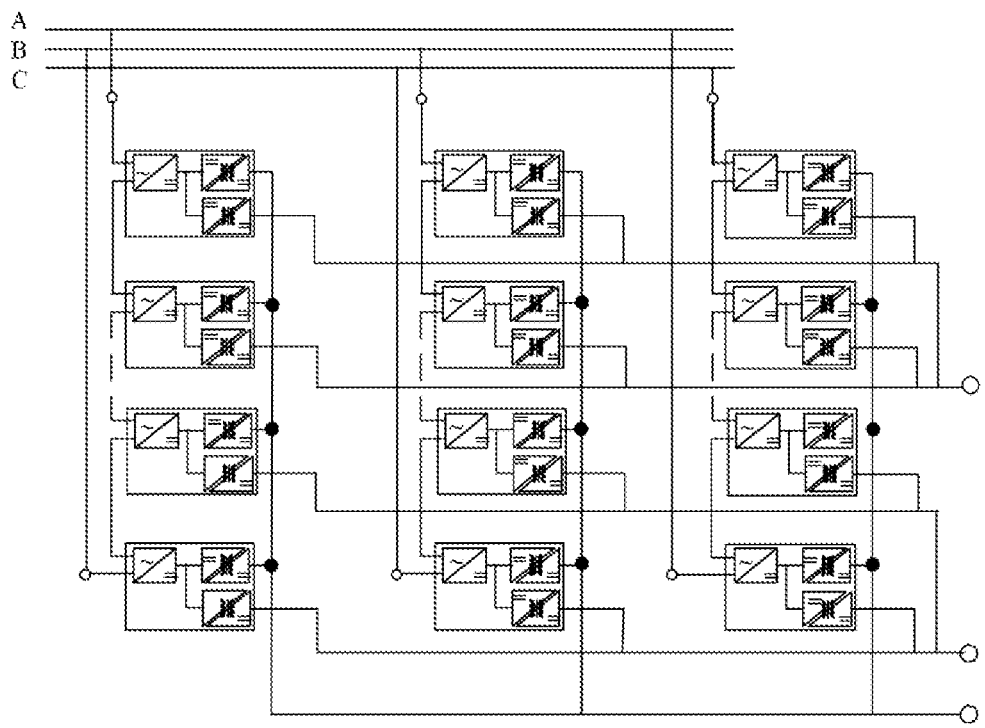
FIG. 29 is a schematic structural diagram of a three-phase power conversion system shown in another embodiment of the present application.

FIG. 29 is a schematic structural diagram of a three-phase power conversion system shown in another embodiment of the present application. As shown in FIG. 29, on the basis of FIG. 28, the second ports of the second power modules in the at least three power conversion systems are connected in parallel to form an output port.

In an implementation, on the basis of FIG. 28 and FIG. 29, the power buses of power conversion systems of respective phases in the three-phase power conversion system are connected in parallel to form an output port.

Below, on the basis of the power conversion system shown in FIG. 8, the power regulating method for the power conversion system will be described. The power conversion system shown in FIG. 8 can be replaced with any of the above-mentioned power conversion systems.

On the basis of the power conversion system shown in FIG. 8, when the power conversion system includes N power modules, a sum of power of all third ports is $P_s$, power of the second port of an i-th power module is $P_i$, and power of the first port of the i-th power module is $P_{Hi}$. Rated power or maximum power of the second port and the third port in one power module of the power conversion system is $P_r$, and rated power or maximum power of the first port in one power module of the power module is $2P_r$.

Figure 30:
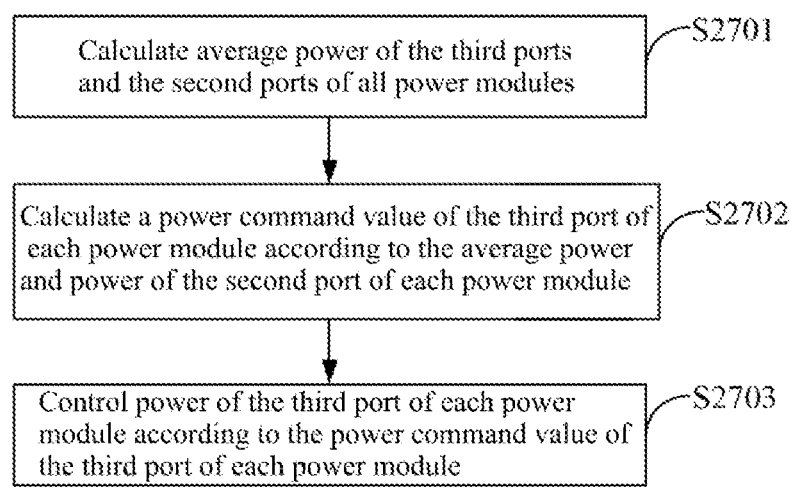
FIG. 30 is a flowchart of a control method for a power conversion system provided by an embodiment of the present application.

FIG. 30 is a flowchart of a control method of a power conversion system provided by an embodiment of the present application. As shown in FIG. 30, the control method for the power conversion system includes:

S2701: calculate average power of the third ports and the second ports of all power modules.

In this embodiment, the third ports of all power modules form a parallel port, the second port of each power module is an independent port, and the parallel port and each independent port are used as charging and discharging ports for charging or discharging external loads. For example, for a charging station, power of loads connected to the ports is different, and at the same time, not all the ports are connected to an external load, which causes the DC link voltage balance problem. For the power conversion system shown in this application, total power of the loads connected to the power conversion system is calculated, and then average power of respective power modules is calculated based on the total power. The calculation formula of the average power of the respective power modules is, for example, formula 1:

$$P_{avg} = \frac{P_s + \sum_{i=1}^{N} P_i}{N} \quad \text{Formula 1}$$

$P_{avg}$ represents the average power of the respective power modules.

It should be noted that when there is no external load at an independent port, power corresponding to the independent port is 0.

S2702: calculate a power command value of the third port of each power module according to the average power and power of the second port of each power module.

In this embodiment, a difference between the average power of the respective power modules and the power of the independent port of a power module is the power command value $P_{si}$ of the third port of the power module, and the calculation formula is shown in formula 2:

$$P_{si} = P_{avg} - P_i \quad \text{Formula 2}$$

S2703: control power of the third port of each power module according to the power command value of the third port of each power module.

In this embodiment, for the third port of each power module, the power of the third port of the power module is controlled to be equal to the power command value of the third port of the power module calculated according to formula 2.

It should be noted that since the maximum power of the third port of each power module is $P_r$, if the power command value $P_{si}$ of the third port calculated according to formula 2 is greater than $P_r$, amplitude limiting is performed on the power command value of the third port of the power module, to limit the power command value of the third port of the power module to be $P_r$.

In an implementation, if the power module includes the first power sub-module and the second power sub-module, where the second end of the second power sub-module is electrically connected to the first end of the first power sub-module through the DC link, when the power command value $P_{si}$ of the third port of the power module is greater than $P_r$, the DC link voltage balance control can be done by a combination with other control methods (for example, when the second power sub-module includes an AC-DC conversion circuit, a reactive current injection method can be used, and when the second power sub-module includes a DC-DC conversion circuit, an input port voltage adjustment method can be used).

For example, on the basis of the above method, the above method can also be combined with the reactive current injection method. When the power (i.e. power command value $P_{si}$) required to be output by the third port is greater than $P_r$, power balance of the first ports cannot be performed through the third ports. At this time, it is necessary to combine with the existing control method. For example, the second power sub-module adopts the reactive current injection method. It should be noted that the combination of the above method and the reactive current injection method has higher efficiency under heavy load (for example, when the power of each independent port is greater than its half-load power).

Figure 31:
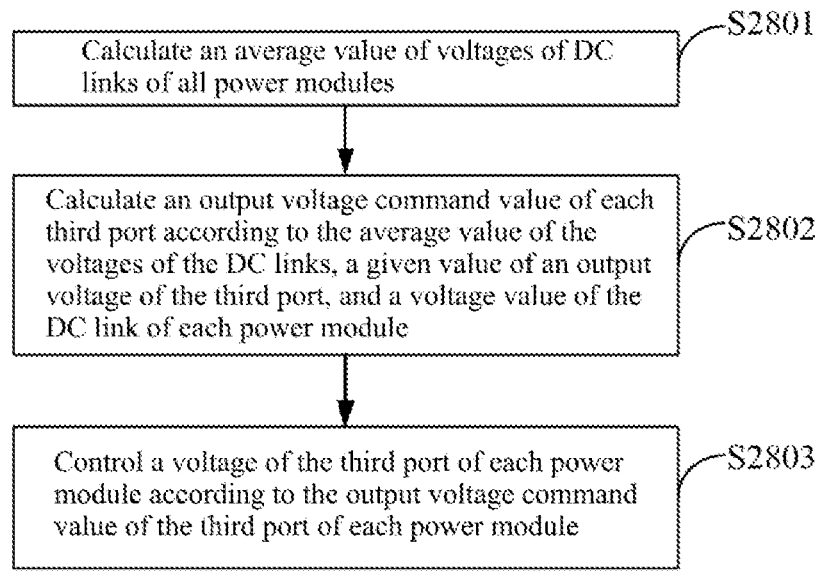
FIG. 31 is a flowchart of a control method for a power conversion system provided by another embodiment of the present application.

FIG. 31 is a flowchart of a control method for a power conversion system provided by another embodiment of the present application. As shown in FIG. 31, the control method for the power conversion system includes:

S2801: calculate an average value of voltages of DC links of all power modules.

In this embodiment, in the power conversion system, each power module is provided with a DC link. If the power module includes the first power sub-module and the second power sub-module, the DC link is a circuit part that connects the first power sub-module to the second power sub-module. If the power module only includes the first power sub-module, then the DC link is a circuit part that connects the first power sub-module circuit to the power supply.

A voltage of the DC link in any power module in the power conversion system is $V_{dci}$, an average value $V_{dcavg}$ of the voltages $V_{dci}$ of the DC links in all power modules in the power conversion system is calculated with the calculation formula, such as formula 3:

$$V_{dcavg} = \frac{1}{N} \sum_{i=1}^{N} V_{dci}$$ Formula 3

N represents an amount of all power modules.

S2802: calculate an output voltage command value of each third port according to the average value of the voltages of the DC links, a given value of an output voltage of the third port, and a voltage value of the DC link of each power module.

In this embodiment, the output voltage command value of each third port is calculated according to formula 4:

$$V_{refi} = V_{seti} + K_d(V_{dci} - V_{dcavg})$$ Formula 4

$V_{seti}$ represents the given value of the output voltage of the third port of the i-th power module, $K_d$ is a constant which is a given value.

S2803: control a voltage of the third port of each power module according to the output voltage command value of the third port of each power module.

In this embodiment, after calculating the output voltage command value of the third port of each power module, a closed-loop control of the voltage of the third port of each power module is performed according to the output voltage command value of the third port, so that the power of the parallel port is automatically distributed.

It should be noted that since the maximum output power of the third port of each power module is $P_r$, if the power command value of the third port is greater than $P_r$, amplitude limiting is performed on the power command value of the third port of the power module, to limit the power of the third port of the power module to be $P_r$.

In an implementation, if the power module includes the first power sub-module and the second power sub-module, where the second end of the second power sub-module is electrically connected to the first end of the first power sub-module through the DC link, in the case that there is no intervention by an external power supply, power at the first end of the first power sub-module is the same as the input power flowing into the power module through the first port. When the power command value of the third port of the power module is greater than $P_r$, existing control methods (for example, reactive current injection can be used when the second power sub-module includes an AC-DC conversion circuit, and the input port voltage adjustment method can be used when the second power sub-module includes a DC-DC conversion circuit) can be combined to perform the pre-stage voltage balance control, that is, the DC link voltage balance control.

It should be noted that in the three-phase power conversion system, since the third ports of the power modules included in each power conversion system are not connected in parallel, the power balance between phases cannot be achieved through the methods shown FIG. 30 and FIG. 31. Therefore, it is necessary to combine the existing control methods (for example, zero-sequence current injection can be used when the second power sub-module includes an AC-DC conversion circuit and is of a Delta connection) to perform the DC link voltage balance control.

The control principle of the control method for the power conversion system shown in FIG. 30 and FIG. 31 is: when a DC link voltage balance problem occurs, utilizing the first power sub-module of the power conversion system to perform voltage balance control is in priority. When the power at the parallel port is limited in amplitude, or when the voltage balance ability the post-stage circuit is lost, the second power sub-module is used for voltage balance.

Figure 32:
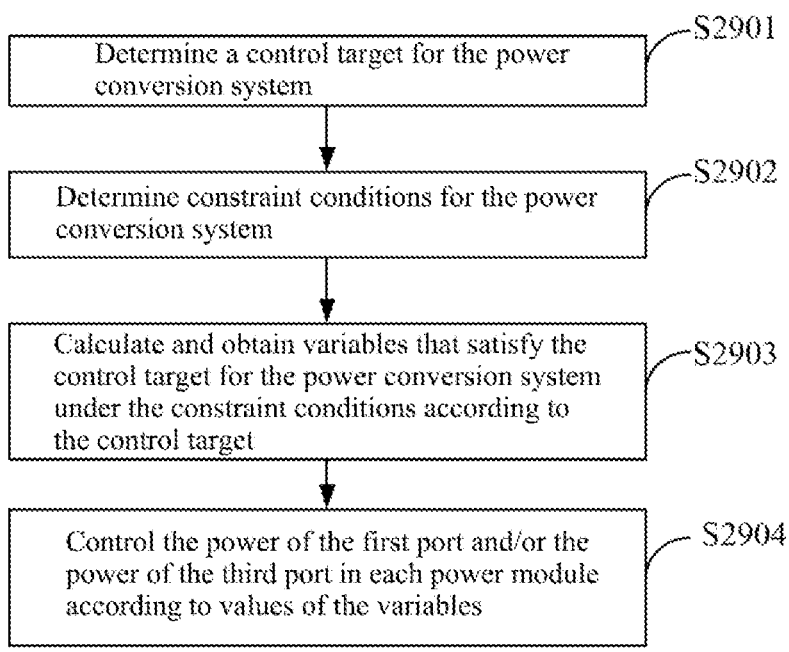
FIG. 32 is a flowchart of a control method for a power conversion system provided by yet another embodiment of the present application.

In an embodiment, for the architecture of the power conversion system proposed in this application, flexible configuration can also be made with the method of using a second power sub-module for voltage balance, where the first power sub-module is used to balance a part of power, and the second power sub-module is used to balance the remaining imbalanced power. The combination of the control of the two power sub-modules can not only achieve voltage balance, but also achieve goals of such as optimal system efficiency. As shown in FIG. 32, according to this idea, this application also proposes a control method for the power conversion system. The control method for the power conversion system shown in FIG. 32 is described on the basis of the power conversion system shown in FIG. 8.

S2901: determine a control target for the power conversion system.

In this embodiment, a lowest loss of the power conversion system is taken as the control target, and a corresponding target function is shown in formula 5:

$$\min J = \sum_{k=1}^{n} a f_1(P_{Hk}^2) + b f_2(P_{sk}^2) \quad \text{Formula 5}$$

J represents a loss of the power conversion system, $f_1(P_{Hk}^2)$ reflects a loss of the second power sub-module, $f_2(P_{sk}^2)$ reflects a loss of the DC-DC circuit corresponding to the parallel port in the first power sub-module, a and b are weighting coefficients which characterize respective influence of the power loss of the second power sub-module and the power loss of the DC-DC circuit corresponding to the parallel port in the first power sub-module of each power module on the total loss of the power conversion system. Different systems may have different weighting coefficients.

It should be noted that the DC-DC circuit corresponding to the independent port in the first power sub-module will also generate a loss, which however is a constant loss. Therefore, the loss generated by the DC-DC circuit corresponding to the independent port is not added in formula 5.

S2902: determine constraint conditions for the power conversion system.

In this embodiment, the constraint conditions for the power conversion system are as shown in formula 6-formula 8:

$$P_{HK}^2 \leq (2P_r)^2 \quad \text{Formula 6}$$

$$P_{sk}^2 \leq (P_r)^2 \quad \text{Formula 7}$$

$$P_{Hk} = P_{sk} + P_k \quad \text{Formula 8}$$

S2903: calculate and obtain variables that satisfy the control target for the power conversion system under the constraint conditions according to the control target.

In this embodiment, according to the target function and constraint conditions, the variables that satisfy the target function under the constraint conditions, namely, $P_{Hk}$ and $P_{sk}$, are obtained through optimization algorithms or other calculation methods.

S2904: control the power of the first port and/or the power of the third port in each power module according to values of the variables.

In this embodiment, according to the calculated $P_{Hk}$ and $P_{sk}$, the power of the first port in each power module is controlled to be $P_{Hk}$, and/or the power of the third port in each power module is controlled to be $P_{sk}$.

Finally, it should be noted that: the above embodiments are only used to illustrate but not to limit the technical solution of the present disclosure. Although the present disclosure has been described in detail with reference to the foregoing embodiments, those of ordinary skill in the art should understand that the technical solutions described in the foregoing embodiments may still be modified, or some or all of the technical features may be equivalently replaced; and these modifications or replacements do not cause the essence of the corresponding technical solutions to deviate from the scope of the technical solutions of the embodiments of the present disclosure.

What is claimed is:

1. A power conversion system, comprising:
a first power module and a second power module, wherein each power module comprises a first port, a second port and a third port;
the second port of the first power module and the second port of the second power module are independent of each other; and
the third port of the first power module and the third port of the second power module are connected in parallel to form a power bus, and power flow of the third port is bidirectional.

2. The power conversion system according to claim 1, wherein the first port of the first power module and the first port of the second power module are connected in series and then electrically connected to an external device.

3. The power conversion system according to claim 1, wherein when power of the second port of the first power module is not equal to power of the second port of the second power module, the third port of the first power module and the third port of the second power module exchange power through the power bus, so that power of the first port of the first power module and power of the first port of the second power module tend to be equal.

4. The power conversion system according to claim 3, wherein the second port of the first power module and the second port of the second power module output power respectively, and when the power output by the second port of the first power module is less than the power output by the second port of the second power module, at least part of input power of the first port of the first power module is transferred to the third port of the first power module, and then transferred to the third port of the second power module through the power bus, and finally transferred to the second port of the second power module, so that the input power of the first port of the first power module and input power of the first port of the second power module tend to be equal.

5. The power conversion system according to claim 3, wherein the second port of the first power module and the second port of the second power module input power respectively, and when input power of the second port of the first power module is less than input power of the second port of the second power module, at least part of the input power of the second port of the second power module is transferred to the third port of the second power module, and then transferred to the third port of the first power module through the power bus, and finally transferred to the second port of the first power module, so that output power of the first port of the first power module and output power of the first port of the second power module tend to be equal.

6. The power conversion system according to claim 3, wherein when the second port of the first power module is used to output power and the second port of the second power module is used to input power, at least part of input power of the second port of the second power module is transferred to the third port of the second power module, and then transferred to the third port of the first power module through the power bus, and finally transferred to the second port of the first power module, so that the power of the first port of the first power module and the power of the first port of the second power module tend to be equal.

7. The power conversion system according to claim 1, wherein the first power module and the second power module respectively comprise a first power sub-module, the first power sub-module comprises a first end, a second end, and a third end, the first port is electrically connected to the first end of the first power sub-module, the second port is electrically connected to the second end of the first power sub-module, and the third port is electrically connected to the third end of the first power sub-module, and the first end and the second end of the first power sub-module are direct current (DC) ends.

8. The power conversion system according to claim 7, wherein the first power sub-module comprises a first DC-DC conversion circuit and a second DC-DC conversion circuit, the first end of the first power sub-module is electrically connected to a first end of the first DC-DC conversion circuit and a first end of the second DC-DC conversion circuit, a second end of the first DC-DC conversion circuit is electrically connected to the second end of the first power sub-module, and a second end of the second DC-DC conversion circuit is connected to the third end of the first power sub-module.

9. The power conversion system according to claim 8, wherein a switching frequency of the first DC-DC conversion circuit and a switching frequency of the second DC-DC conversion circuit are different.

10. The power conversion system according to claim 7, wherein the first power sub-module comprises a multi-winding transformer, the multi-winding transformer comprises a primary winding, a first secondary winding and a second secondary winding, the first end of the first power sub-module is electrically connected to the primary winding through an inverter circuit, the first secondary winding is electrically connected to the second end of the first power sub-module through a first rectifier circuit, and the second secondary winding is electrically connected to the third end of the first power sub-module.

11. The power conversion system according to claim 7, wherein the first power sub-module comprises an eighth DC-DC conversion circuit and a ninth DC-DC conversion circuit, the first end of the first power sub-module is electrically connected to a first end of the eighth DC-DC conversion circuit, a second end of the eighth DC-DC conversion circuit is electrically connected to the second end of the first power sub-module, a first end of the ninth DC-DC conversion circuit is electrically connected to the second end of the eighth DC-DC conversion circuit, and a second end of the ninth DC-DC conversion circuit is electrically connected to the third end of the first power sub-module.

12. The power conversion system according to claim 7, wherein the first power sub-module comprises a tenth DC-DC conversion circuit and a first DC-AC conversion circuit, the first end of the first power sub-module is electrically connected to a first end of the tenth DC-DC conversion circuit, a second end of the tenth DC-DC conversion circuit is electrically connected to the second end of the first power sub-module, a first end of the first DC-AC conversion circuit is electrically connected to the first end of the first power sub-module, and the first DC-AC conversion circuit comprises a transformer having a secondary winding electrically connected to the third end of the first power sub-module.

13. The power conversion system according to claim 7, wherein the first power sub-module comprises an eleventh DC-DC conversion circuit and a second DC-AC conversion circuit, the first end of the first power sub-module is electrically connected to a first end of the eleventh DC-DC conversion circuit, a second end of the eleventh DC-DC conversion circuit is electrically connected to the second end of the first power sub-module, a first end of the second DC-AC conversion circuit is electrically connected to the second end of the first power sub-module, and the second DC-AC conversion circuit comprises a transformer having a secondary winding electrically connected to the third end of the first power sub-module.

14. The power conversion system according to claim 7, wherein the first power module and the second power module respectively comprise a second power sub-module, and the first end of the first power sub-module is electrically connected to the first port through the second power sub-module.

15. A three-phase power conversion system, wherein each phase comprises the power conversion system according to claim 1; and wherein the first port is an AC port, and the three-phase power conversion system is a three-phase three-wire or three-phase four-wire system, and is Delta connection or star connection system.

16. The three-phase power conversion system according to claim 15, wherein second ports of first power modules in at least three power conversion systems are connected in parallel, at least one of the at least three power conversion systems belongs to a first phase power conversion system in the three-phase power conversion system, at least one of the at least three power conversion systems belongs to a second phase power conversion system in the three-phase power conversion system, and at least one of the at least three power conversion systems belongs to a third phase power conversion system in the three-phase power conversion system.

17. The three-phase power conversion system according to claim 16, wherein second ports of second power modules in the at least three power conversion systems are connected in parallel; and power buses of power conversion systems of respective phases in the three-phase power conversion system are connected in parallel.

18. A control method for a power conversion system, wherein the power conversion system comprises a first power module and a second power module, and each power module comprises a first port, a second port and a third port;

the second port of the first power module and the second port of the second power module are independent of each other; and the third port of the first power module and the third port of the second power module are connected in parallel to form a power bus, and power flow of the third port is bidirectional, and the control method comprises:

calculating average power of third ports and second ports of all power modules;

calculating a power command value of the third port of each power module according to the average power and power of the second port of each power module; and controlling the power of the third port of each power module according to the power command value of the third port of each power module.

19. The control method according to claim 18, wherein the first power module and the second power module respectively comprise a first power sub-module and a second power sub-module, a first end of the second power sub-module is electrically connected to the first port, a second end of the second power sub-module is electrically connected to the first power sub-module through a DC link, and the second power sub-module performs voltage balance control on the DC link.

20. The control method according to claim 19, wherein when the power of the third port is greater than rated power, amplitude limiting is performed on the power command value.

21. A control method for a power conversion system, wherein the power conversion system comprises a first power module and a second power module, and each power module comprises a first port, a second port and a third port;

the second port of the first power module and the second port of the second power module are independent of each other; and the third port of the first power module and the third port of the second power module are connected in parallel to form a power bus, power flow of the third port is bidirectional, and each power module comprises a DC link, and the control method comprises:

calculating an average value of voltages of DC links of all power modules;

calculating an output voltage command value of each third port according to the average value of the voltages of the DC links, a given value of an output voltage of the third port, and a voltage value of the DC link of each power module; and controlling a voltage of the third port of each power module according to the output voltage command value of the third port of each power module.

22. The control method according to claim 21, wherein the first power module and the second power module respectively comprise a first power sub-module and a second power sub-module, a first end of the second power sub-module is electrically connected to the first port, a second end of the second power sub-module is electrically connected to the first power sub-module through the DC link, and the second power sub-module performs voltage balance control on the DC link.

23. The control method according to claim 22, wherein when the power of the third port is greater than rated power, amplitude limiting is performed on the power command value.

* * * * *